US012532207B2

(12) United States Patent
Zorgui et al.

(10) Patent No.: US 12,532,207 B2
(45) Date of Patent: Jan. 20, 2026

(54) CHANNEL MONITORING CONFIGURATION PARAMETER ADJUSTMENT BASED ON NETWORK ENERGY SAVING (NES) STATE

(71) Applicant: QUALCOMM Incorporated, San Diego, CA (US)

(72) Inventors: Marwen Zorgui, San Diego, CA (US); Ahmed Elshafie, San Diego, CA (US); Ahmed Attia Abotabl, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/185,985

(22) Filed: Mar. 17, 2023

(65) Prior Publication Data

US 2024/0314607 A1    Sep. 19, 2024

(51) Int. Cl.
*H04W 24/10* (2009.01)
*H04W 52/02* (2009.01)

(52) U.S. Cl.
CPC ....... *H04W 24/10* (2013.01); *H04W 52/0216* (2013.01)

(58) Field of Classification Search
CPC ............. H04W 24/10; H04W 52/0216; H04W 52/0229; H04W 52/0235; Y02D 30/70
See application file for complete search history.

(56) References Cited

U.S. PATENT DOCUMENTS

| | | | | |
|---|---|---|---|---|
| 11,546,853 | B2* | 1/2023 | Agiwal | ................... H04W 4/40 |
| 2020/0205075 | A1* | 6/2020 | Nam | ................. H04W 52/0241 |
| 2020/0236692 | A1* | 7/2020 | Lin | ...................... H04W 72/535 |
| 2020/0313833 | A1* | 10/2020 | Yi | ........................... H04L 5/001 |
| 2020/0314747 | A1* | 10/2020 | Zhou | ................... H04W 52/143 |
| 2021/0144601 | A1* | 5/2021 | Kazmi | ............. H04W 36/0088 |
| 2021/0314866 | A1* | 10/2021 | Lee | ................... H04W 52/0229 |
| 2022/0159702 | A1* | 5/2022 | Seo | ........................ H04L 5/0094 |

FOREIGN PATENT DOCUMENTS

WO    WO2020221093 A1 *  11/2020

* cited by examiner

*Primary Examiner* — Afshawn M Towfighi
(74) *Attorney, Agent, or Firm* — NORTON ROSE FULBRIGHT US LLP

(57) ABSTRACT

This disclosure provides systems, methods, and devices for wireless communication that support dynamically adapting one or more operations performed by a user equipment (UE) based on a state of a communication network according to one or more aspects. In a first aspect, a method of wireless communication, performed by a UE, includes receiving a search space (SS) configuration of an SS. The SS configuration includes, for each parameter of a plurality of parameters of the SS, an offset indicator associated with a network energy saving (NES) state of a plurality of NES states. Additionally, the method includes configuring one or more parameters of the plurality of parameters of the SS based on the SS configuration. Other aspects and features are also claimed and described.

30 Claims, 8 Drawing Sheets

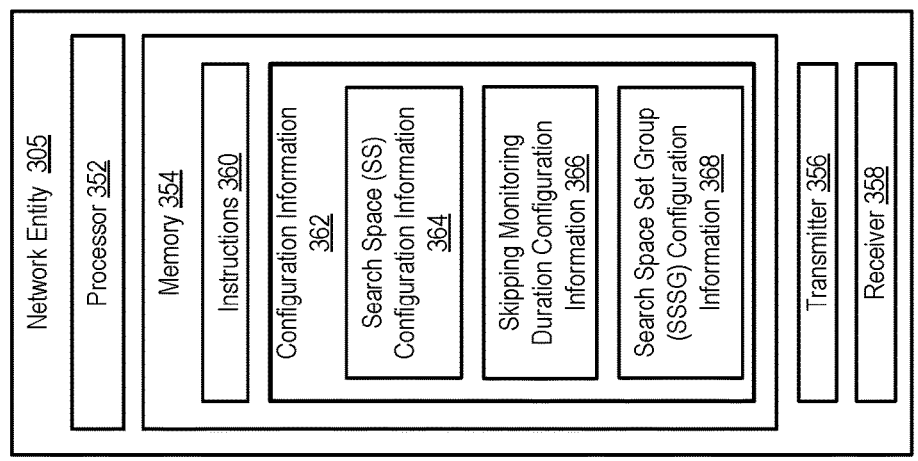
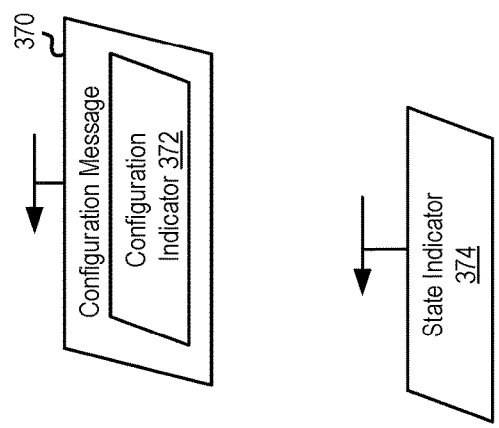
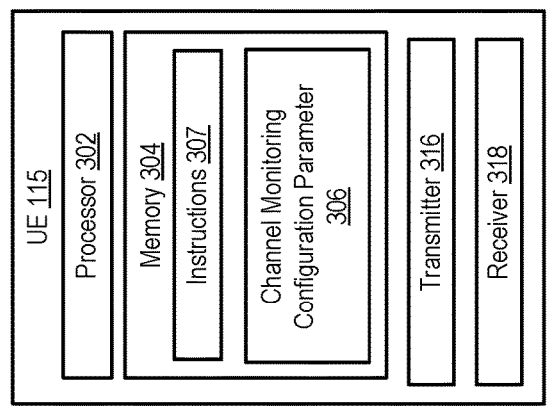
FIGURE 3

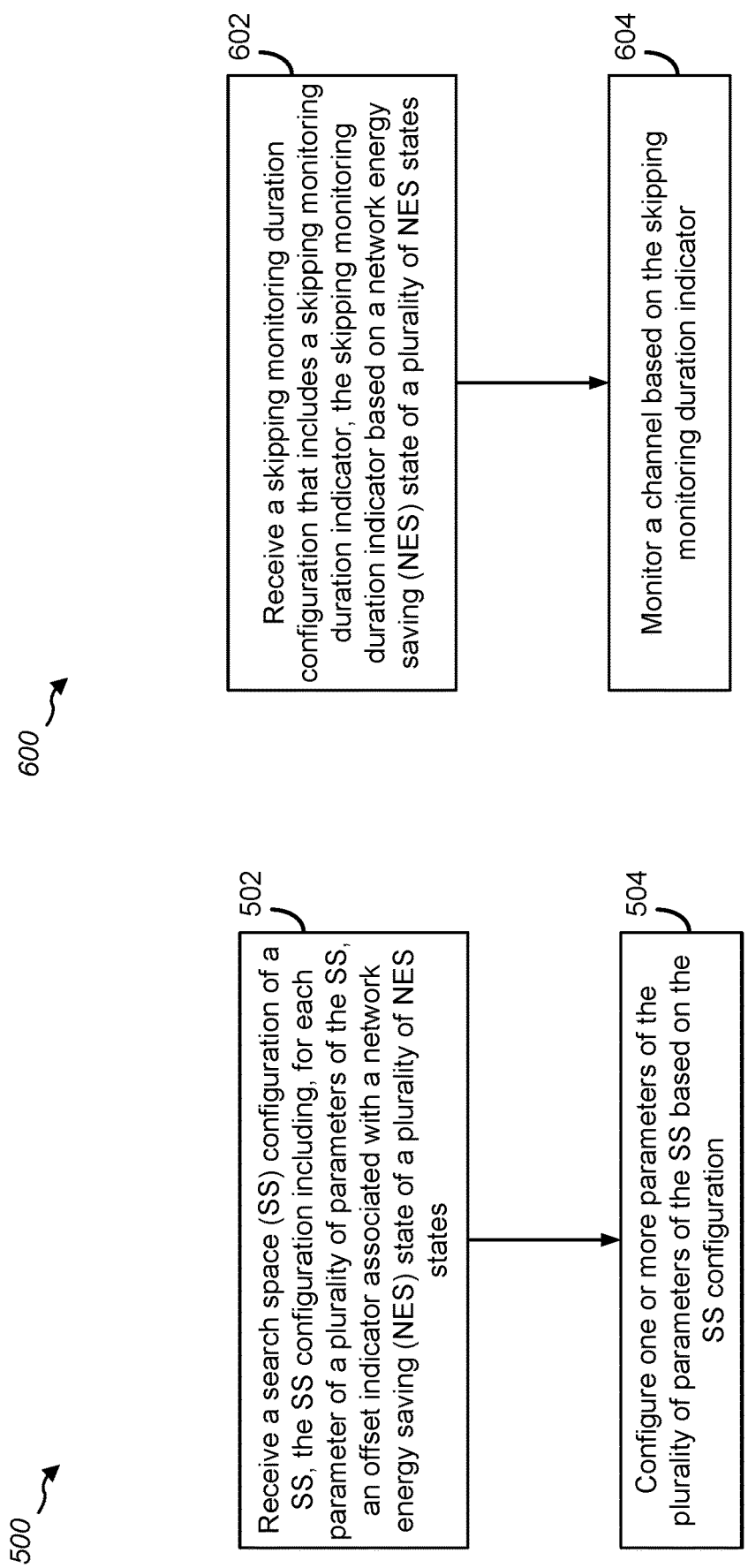

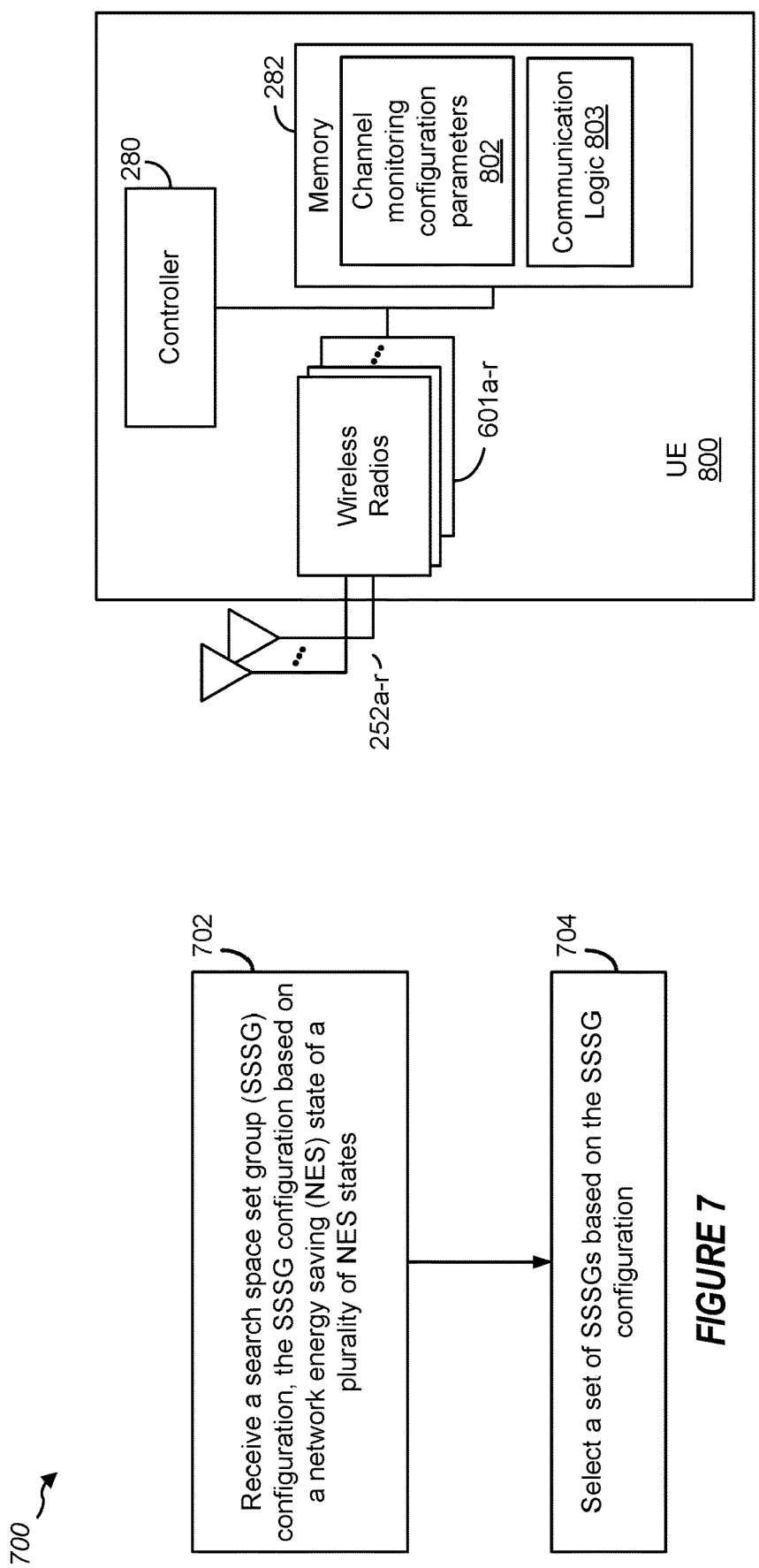

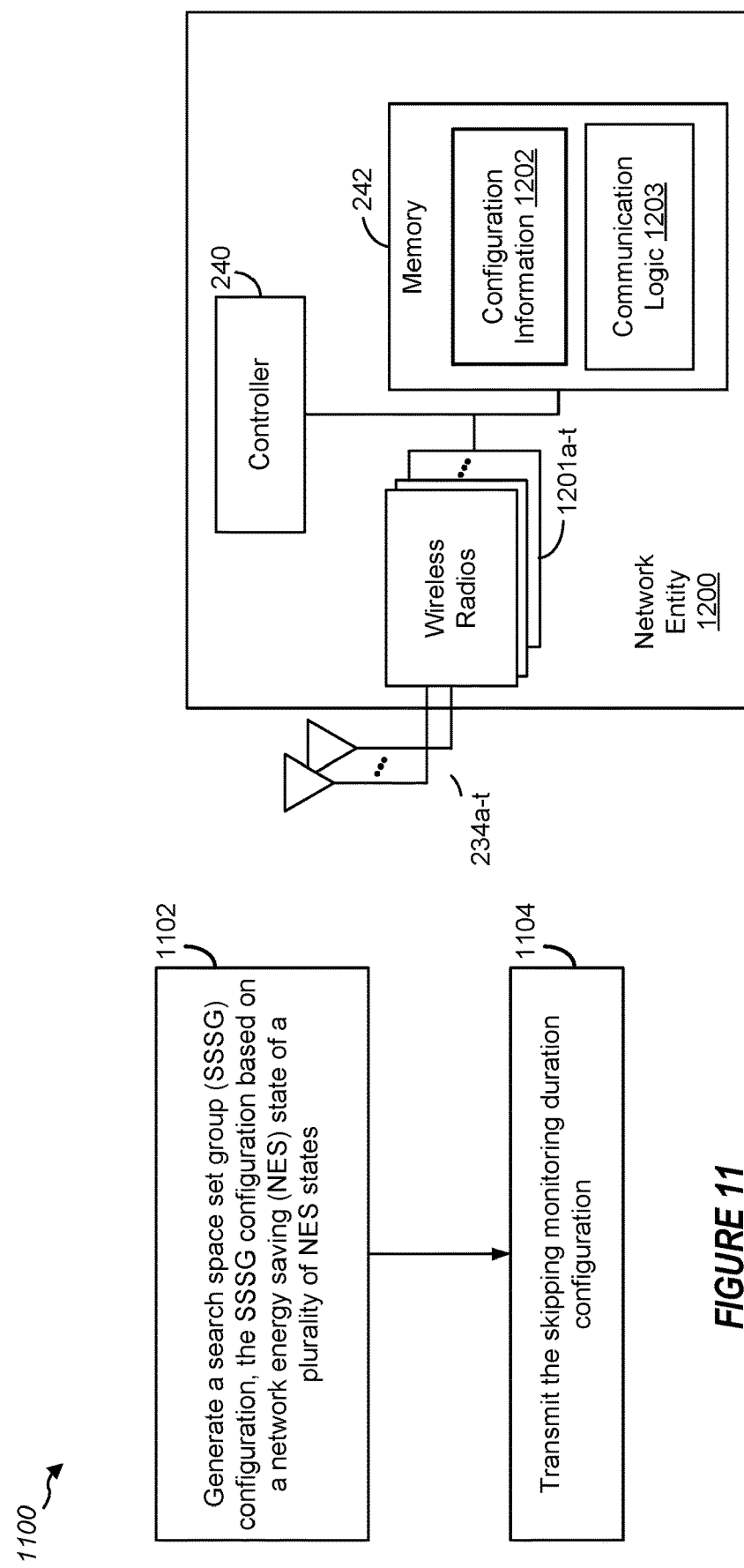

CHANNEL MONITORING CONFIGURATION PARAMETER ADJUSTMENT BASED ON NETWORK ENERGY SAVING (NES) STATE

TECHNICAL FIELD

Aspects of the present disclosure relate generally to wireless communication systems, and more particularly, to adjustment of one or more operations based on a state of a communication network, such as adjustment of monitoring a channel by a user equipment (UE) based on a network energy saving (NES) state of the communication network. Some features may enable and provide improved energy efficiency in the operation of a communication network.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a network entity via downlink and uplink. The downlink (or forward link) refers to the communication link from the network entity to the UE, and the uplink (or reverse link) refers to the communication link from the UE to the base station.

A network entity may transmit data and control information on a downlink to a UE or may receive data and control information on an uplink from the UE. On the downlink, a transmission from the network entity may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

A UE consumes energy when the UE monitors channels, such as a physical downlink control channel (PDCCH). Energy consumption can be a significant operating expense associated with a communication network. For example, energy expenses constitute approximately a quarter of the total operating expenses associated with operating a communication network. Additionally, approximately half of the energy expended by a communication network is attributable to operating a radio access network (RAN). Accordingly, to conserve energy, components of a communication network, such as one or more network entities, are configured to operate in different network energy saving (NES) states that typically depend upon a quantity of network traffic. For instance, when there exists a large volume of network traffic, the communication network usually operates in a first NES state corresponding to high energy usage. Conversely, when there exists a reduced volume of network traffic, the communication network usually operates in a second NES state corresponding to low energy usage. However, the UE does not adjust its operations based on the NES state, thereby potentially operating in an energetically suboptimal fashion, which wastes energy.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes receiving a search space (SS) configuration of an SS. The SS configuration includes, for each parameter of a plurality of parameters of the SS, an offset indicator associated with a network energy saving (NES) state of a plurality of NES states. The method also includes configuring one or more parameters of the plurality of parameters of the SS based on the SS configuration.

In an additional aspect of the disclosure, an apparatus includes at least one processor and a memory coupled to the at least one processor. The at least one processor is configured to receive an SS configuration of an SS. The SS configuration includes, for each parameter of a plurality of parameters of the SS, an offset indicator associated with an NES state of a plurality of NES states. The at least one processor is further configured to configure one or more parameters of the plurality of parameters of the SS based on the SS configuration.

In an additional aspect of the disclosure, an apparatus includes means for receiving an SS configuration of an SS. The SS configuration includes, for each parameter of a plurality of parameters of the SS, an offset indicator associated with an NES state of a plurality of NES states. The apparatus further includes means for configuring one or more parameters of the plurality of parameters of the SS based on the SS configuration.

In an additional aspect of the disclosure, a non-transitory computer-readable medium stores instructions that, when executed by a processor, cause the processor to perform operations. The operations include receiving an SS configuration of an SS. The SS configuration includes, for each parameter of a plurality of parameters of the SS, an offset indicator associated with an NES state of a plurality of NES states. The operations further include configuring one or more parameters of the plurality of parameters of the SS based on the SS configuration.

In one aspect of the disclosure a method for wireless communication is performed by a UE. The method includes receiving a skipping monitoring duration configuration that includes a skipping monitoring duration indicator. The skipping monitoring duration indicator is based on an NES state of a plurality of NES states. The method also includes monitoring a channel based on the skipping monitoring duration indicator.

In an additional aspect of the disclosure, an apparatus includes at least one processor and a memory coupled to the at least one processor. The at least one processor is configured to receive a skipping monitoring duration configuration that includes a skipping monitoring duration indicator. The skipping monitoring duration indicator is based on an NES state of a plurality of NES states. The at least one processor is further configured to monitor a channel based on the skipping monitoring duration indicator.

In an additional aspect of the disclosure, an apparatus includes means for receiving a skipping monitoring duration configuration that includes a skipping monitoring duration indicator. The skipping monitoring duration indicator is based on an NES state of a plurality of NES states. The apparatus further includes means for monitoring a channel based on the skipping monitoring duration indicator.

In an additional aspect of the disclosure, a non-transitory computer-readable medium stores instructions that, when executed by a processor, cause the processor to perform operations. The operations include receiving a skipping monitoring duration configuration that includes a skipping monitoring duration indicator. The skipping monitoring duration indicator is based on an NES state of a plurality of NES states. The operations further include monitoring a channel based on the skipping monitoring duration indicator.

In one aspect of the disclosure, a method for wireless communication is performed by a UE. The method includes receiving a search space set group (SSSG) configuration. The SSSG configuration is based on an NES state of a plurality of NES states. The method also includes selecting a set of SSSGs based on the SSSG configuration.

In an additional aspect of the disclosure, an apparatus includes at least one processor and a memory coupled to the at least one processor. The at least one processor is configured to receive an SSSG configuration. The SSSG configuration is based on an NES state of a plurality of NES states. The at least one processor is further configured to select a set of SSSGs based on the SSSG configuration.

In an additional aspect of the disclosure, an apparatus includes means for receiving an SSSG configuration. The SSSG configuration is based on an NES state of a plurality of NES states. The apparatus further includes means for selecting a set of SSSGs based on the SSSG configuration.

In an additional aspect of the disclosure, a non-transitory computer-readable medium stores instructions that, when executed by a processor, cause the processor to perform operations. The operations include receiving an SSSG configuration. The SSSG configuration is based on an NES state of a plurality of NES states. The operations further include selecting a set of SSSGs based on the SSSG configuration.

In one aspect of the disclosure, a method for wireless communication is performed by a network entity. The method includes generating an SS configuration of an SS. The SS configuration includes, for each parameter of a plurality of parameters of the SS, an offset indicator associated with an NES state of a plurality of NES states. The method also includes transmitting the SS configuration.

In an additional aspect of the disclosure, an apparatus includes at least one processor and a memory coupled to the at least one processor. The at least one processor is configured to generate an SS configuration of an SS. The SS configuration includes, for each parameter of a plurality of parameters of the SS, an offset indicator associated with an NES state of a plurality of NES states. The at least one processor is further configured to transmit the SS configuration.

In an additional aspect of the disclosure, an apparatus includes means for generating an SS configuration of an SS. The SS configuration includes, for each parameter of a plurality of parameters of the SS, an offset indicator associated with an NES state of a plurality of NES states. The apparatus further includes means for transmitting the SS configuration.

In an additional aspect of the disclosure, a non-transitory computer-readable medium stores instructions that, when executed by a processor, cause the processor to perform operations. The operations include generating an SS configuration of an SS. The SS configuration includes, for each parameter of a plurality of parameters of the SS, an offset indicator associated with an NES state of a plurality of NES states. The operations further include transmitting the SS configuration.

In one aspect of the disclosure, a method for wireless communication is performed by a network entity. The method includes generating a skipping monitoring duration configuration that includes a skipping monitoring duration indicator. The skipping monitoring duration indicator is based on an NES state of a plurality of NES states. The method also include transmitting the skipping monitoring duration configuration.

In an additional aspect of the disclosure, an apparatus includes at least one processor and a memory coupled to the at least one processor. The at least one processor is configured to generate a skipping monitoring duration configuration that includes a skipping monitoring duration indicator. The skipping monitoring duration indicator is based on an NES state of a plurality of NES states. The at least one processor is further configured to transmit the skipping monitoring duration configuration.

In an additional aspect of the disclosure, an apparatus includes means for generating a skipping monitoring duration configuration that includes a skipping monitoring duration indicator. The skipping monitoring duration indicator is based on an NES state of a plurality of NES states. The apparatus further includes means for transmitting the skipping monitoring duration configuration.

In an additional aspect of the disclosure, a non-transitory computer-readable medium stores instructions that, when executed by a processor, cause the processor to perform operations. The operations include generating a skipping monitoring duration configuration that includes a skipping monitoring duration indicator. The skipping monitoring duration indicator is based on an NES state of a plurality of NES states. The operations further include transmitting the skipping monitoring duration configuration.

In one aspect of the disclosure, a method for wireless communication is performed by a network entity. The method includes generating an SSSG configuration. The SSSG configuration is based on an NES state of a plurality of NES states. The method also include transmitting the SSSG configuration.

In an additional aspect of the disclosure, an apparatus includes at least one processor and a memory coupled to the at least one processor. The at least one processor is configured to generate an SSSG configuration. The SSSG configuration is based on an NES state of a plurality of NES states. The at least one processor is further configured to transmit the SSSG configuration.

In an additional aspect of the disclosure, an apparatus includes means for generating an SSSG configuration. The SSSG configuration is based on an NES state of a plurality of NES states. The apparatus further includes means for transmitting the SSSG configuration.

In an additional aspect of the disclosure, a non-transitory computer-readable medium stores instructions that, when executed by a processor, cause the processor to perform operations. The operations include generating an SSSG configuration. The SSSG configuration is based on an NES state of a plurality of NES states. The operations further include transmitting the SSSG configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports adjustment of one or more operations based on a state of a communication network according to one or more aspects.

FIG. 5 is a flow diagram illustrating an example process that supports adjustment of one or more operations based on a state of a communication network according to one or more aspects.

FIG. 6 is a flow diagram illustrating an example process that supports adjustment of one or more operations based on a state of a communication network according to one or more aspects.

FIG. 7 is a flow diagram illustrating an example process that supports adjustment of one or more operations based on a state of a communication network according to one or more aspects.

FIG. 8 is a block diagram of an example UE that supports adjustment of one or more operations based on a state of a communication network according to one or more aspects.

FIG. 11 is a flow diagram illustrating an example process that supports adjustment of one or more operations based on a state of a communication network according to one or more aspects.

FIG. 12 is a block diagram of an example network entity that supports adjustment of one or more operations based on a state of a communication network according to one or more aspects.

Like reference numbers and designations in the various drawings indicate like elements.

DETAILED DESCRIPTION

Figure 1:
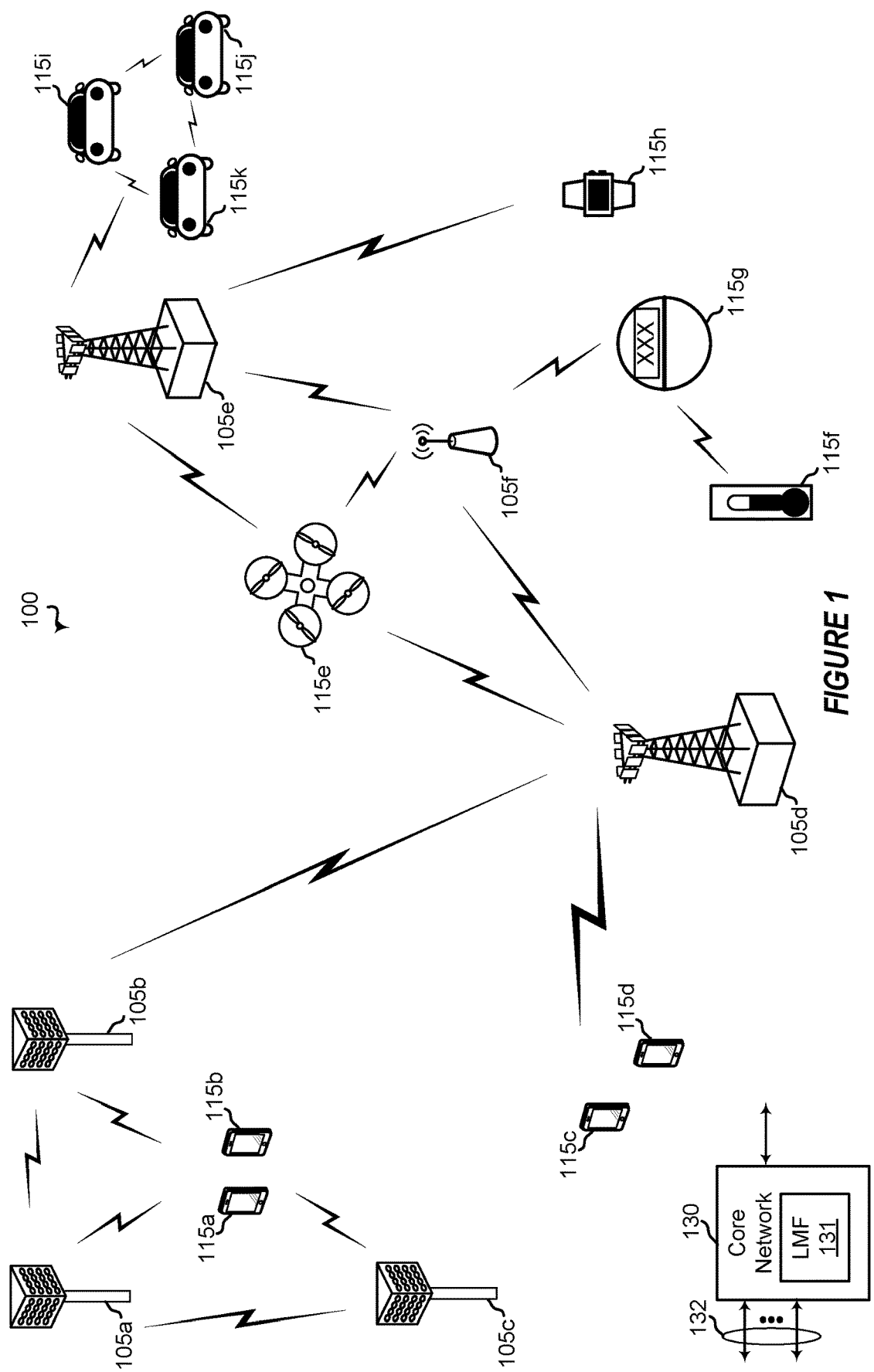
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support adjustment of one or more operations based on a state of a communication network. For example, the present disclosure describes that a UE receives a configuration that is based on or associated with a network energy saving (NES) state of a plurality of NES states. The configuration may include a search space (SS) configuration of an SS, a skipping monitoring duration configuration that includes a skipping monitoring duration indicator, or a search space set group (SSSG) configuration. In some implementations, for the SS configuration, the SS configuration includes, for each parameter of a plurality of parameters of the SS, an offset indicator associated with the NES state, and the UE configures one or more parameters of the plurality of parameters of the SS based on the SS configuration. In some implementations, for the skipping monitoring duration configuration, the skipping monitoring duration configuration is based on the NES state and the UE monitors a channel based on the skipping monitoring duration indicator. In some implementations, for the SSSG configuration, the SSSG configuration is based on the NES state and the UE selects a set of SSSGs based on the SSSG configuration.

Particular implementations of the subject matter described in this disclosure may be implemented to realize one or more of the following potential advantages or benefits. In some aspects, the present disclosure provides techniques that promote energy efficiency in communication network operations by adapting or adjusting UE operations, such as UE channel monitoring operations (e.g., monitoring physical downlink control channel (PDCCH)) in accordance with the NES state of the communication network. In this manner, when one or more components of a wireless communications system, such as a network energy, are in a low energy NES state, such as in a passive state, the UE may adjust channel monitoring configuration parameters, such as one or more parameters of a plurality of parameters of the SS, to reduce an amount of energy that UE consumers in monitoring one or more channels, such as PDCCH. Conversely, when one or more components of a wireless communications system, such as a network energy, are in a high energy NES state, such as when handling a large volume of network traffic or latency sensitive data, the UE may adjust channel monitoring configuration parameters, such as one or more parameters of a plurality of parameters of the SS, to monitor one or more channels (e.g., PDCCH), with greater frequency, corresponding to the requirements of the network. In this manner, overall energy usage of a wireless communication system may be modulated based on network conditions, thereby conserving energy.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example, implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the network entity controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi- Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A network entity may be a station that communicates with the UEs and may also be referred to as an evolved node B (eNB), a next generation eNB (gNB), an access point, and the like. Each network entity (e.g., 105) may provide communication coverage for a particular geographic area. In 3GPP, the term "cell" may refer to this particular geographic coverage area of a network entity or a network entity subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A network entity may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A network entity for a macro cell may be referred to as a macro base station. A network entity for a small cell may be referred to as a small cell base station, a pico base station, a femto network entity or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell network entity which may be a home node or portable access point. A network entity may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a network entity designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105c, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105c.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and network entity 105 are configured to communicate with the LMF 131 via an Access and Mobility Management Function (AMF).

Figure 2:
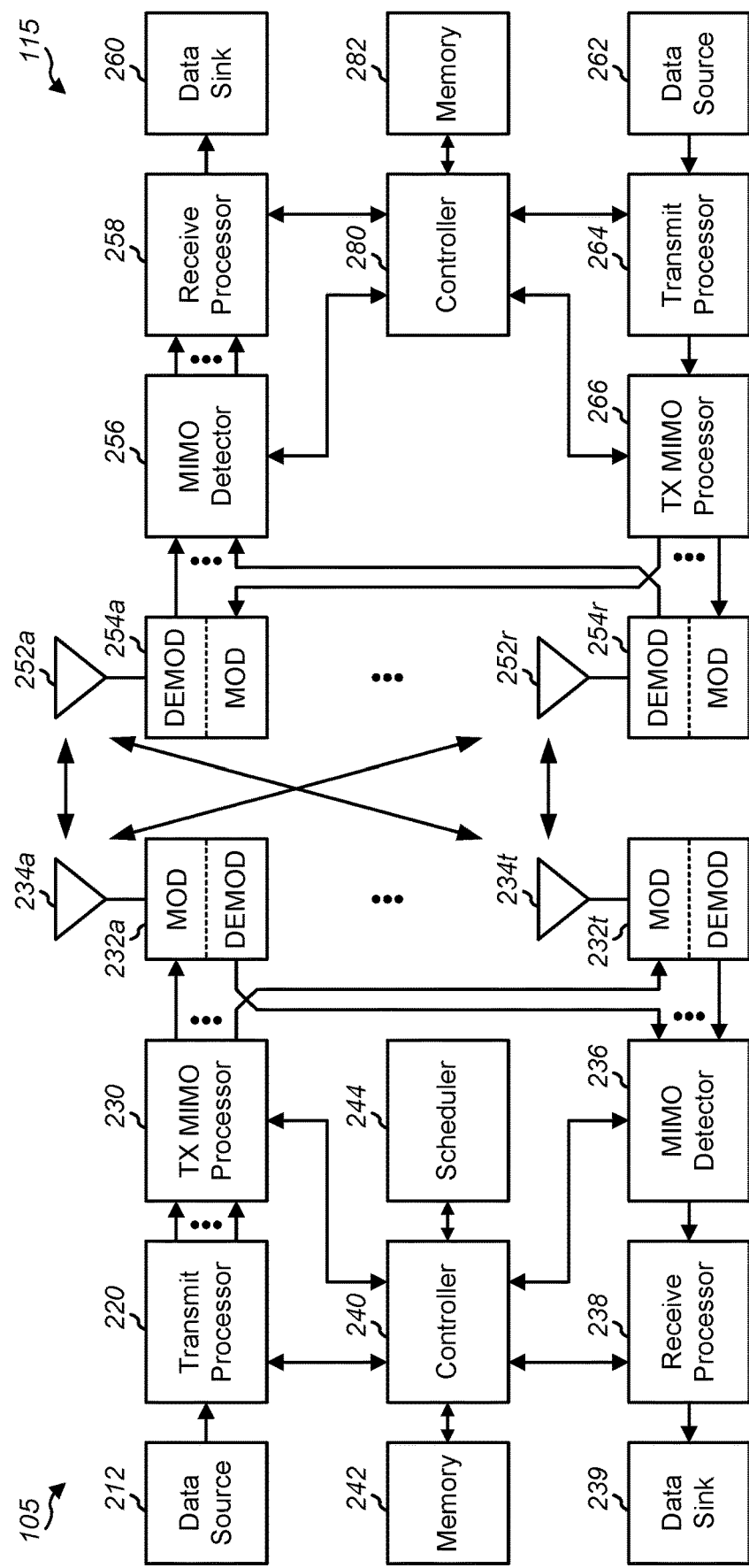
FIG. 2 is a block diagram illustrating examples of a network entity and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a network entity of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5-7 and 9-11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

FIG. 3 is a block diagram of an example wireless communications system 300 that supports adjustment of one or more operations based on a state of a communication network according to one or more aspects. In some examples, wireless communications system 300 may implement aspects of wireless network 100. Wireless communications system 300 includes a UE 115 and a network entity 305. Although one UE 115 and one network entity 305 are illustrated, in some other implementations, wireless communications system 300 may generally include multiple UEs 115, multiple network entity 305, or a combination thereof.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, UE 115 may include an interface (e.g., a communication interface) that includes transmitter 316, receiver 318, or a combination thereof. Processor 302 may be configured to execute instructions 307 stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store instructions 307 and channel monitoring configuration parameter 306. Channel monitoring configuration parameter 306 may include or indicate one or more parameters of an SS, a skipping monitoring duration indicator, a set of SSSGs, or a combination thereof. The one or more parameters of the SS may include or correspond to a monitoring slot periodicity and offset parameter, a duration parameter, a monitoring symbols within a slot parameter, or a number of PDCCH candidates per control channel element (CCE) aggregation level parameter. The monitoring slot periodicity and offset parameter may indicate, to UE 115, a periodicity with which UE 115 is to monitor the SS. For example, a monitoring slot periodicity and offset parameter having a value of sl1 may indicate, to UE 115, to monitor the SS at every slot, while a monitoring slot periodicity and offset parameter having a value of sl4 may indicate, to UE 115, to monitor the SS at every fourth slot. The duration parameter may indicate an amount of time during which UE 115 is to monitor the SS for a PDCCH candidate. The monitoring symbols with a slot parameter may indicate, to UE 115, an orthogonal frequency division multiplexing (OFDM) symbol that UE 115 is to use to initiate PDCCH monitoring of a SS. For instance, a monitoring symbols with a slot parameter value of 1000000000000 may indicate that UE 115 is to use the first OFDM symbol to initiate PDCCH monitoring of the SS, while a monitoring symbols within a slot parameter value of 0100000000000 may indicate that UE 115 is to use the second OFDM symbol to initiate PDCCH monitoring of the SS. The number of PDCCH candidates per control channel element (CCE) aggregation level parameter indicates a quantity of PDCCH candidates per aggregation level. In some implementations, channel monitoring configuration parameter 306 may include a plurality of parameters of the SS. To illustrate, in some implementations, the plurality of parameters of the SS may include, for each parameter, an offset indicator associated with a network energy saving (NES) state of a plurality of NES states.

The skipping monitoring duration indicator may include or correspond to an amount of time during which UE 115 may be configured to avoid or skip monitoring a channel, such as PDCCH. The set of SSSGs may include or correspond to SSSGs from which UE 115 may be configured to select one or more SSSG. In some implementations, memory 304 may include channel monitoring configuration information that includes or indicates channel monitoring configuration parameter 306.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, network entity 305. In some implementations, transmitter 316 and receiver 318 may be integrated in one or more transceivers. Additionally or alternatively, transmitter 316 or receiver 318 may include or correspond to one or more components of UE 115 described with reference to FIG. 2.

In some implementations, UE 115 may include one or more antenna arrays. The one or more antenna arrays may be coupled to transmitter 316, receiver 318, or a communication interface. The antenna array may include multiple antenna elements configured to perform wireless communications with other devices, such as with the network entity 305. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

UE 115 may be configured to monitor one or more channels, such as a PDCCH, through an SS that identifies how and where to search for PDCCH candidates. Each SS may be associated with a control resource set (CORSET). Additionally, there exist at least two PDCCH monitoring adaptations that may be identified to UE 115 through downlink control information (DCI). One such PDCCH monitoring adaption may be referred to as PDCCH skipping, and the other PDCCH monitoring adaption may be referred to as SSSG switching. In general, PDCCH skipping and SSSG switching may be applied for at least type three common search spaces (CSS) and UE specific search spaces (USS).

In response to receiving DCI that activates PDCCH skipping, UE 115 may periodically avoid monitoring PDCCH in a bandwidth part (BWP) for a time duration, referred to as a skip duration, established by a parameter of the scheduling DCI and that may be a function of subcarrier spacing. UE 115 may be configurable to receive up to three skip duration values, and each skip duration value may last for up to 100 ms. Additionally, UE 115 may be configured to ignore PDCCH skipping in certain cases. For example, the UE 115 may not apply PDCCH skipping when monitoring a type 0, 0A, 1, or 2 CSS for PDCCH. As another example, UE 115 may ignore or override PDCCH skipping when monitoring DCI format 2_6 (e.g., a wake-up signal (WUS)) in a type 3 CSS. Moreover, UE 115 may ignore or override PDCCH skipping when monitoring DCI formats 0_0, 1_0, or both with cell-radio network temporary identifier (C-RNTI), modulation and coding scheme-cell-radio network temporary identifier (MCS-C-RNTI), or configured scheduling-radio network temporary identifier (CS-RNTI) in type 0, 0A, 1, or 2 CSS.

In response to receiving DCI that activates SSSG switching, UE 115 may exhibit particular SSSG functionality based on instructions received via the DCI. One such SSSG functionality may be that UE 115 ceases monitoring SS sets associated with particular SSSG, such as SSSG #1 and SSSG #2, while initiating monitoring of SS sets associated with a particular SSSG, such as SSSG #0. Another such SSSG functionality may be that UE 115 ceases monitoring SS sets associated with SSSG #0 and SSSG #2 and initiates monitoring of SS sets associated with SSSG #1. Yet another such SSSG functionality may be that UE 115 ceases monitoring SS sets associated with SSSG #0 and SSSG #1 and initiates monitoring of SS sets associated with SSSG #2. The foregoing functionalities, collectively, may be referred as SSSG switching.

In some implementations, UE 115 may initiate switching from a first SSSG to a second SSSG based on clock-based signal, such as intermediated by an SSSG timer. UE 115 may set or may be configured, by a network entity (e.g., 305), to set an SSSG timer at a first time slot after switching to SSSG #1, after switching to SSSG #2, or both. UE 115 may be configured to reset the SSSG timer after a time slot at which UE 115 detects a DCI format with CRC scrambled by C-RNTI, CS-RNTI, MCS-C-RNTI, or a combination thereof, such as designating unicast PDCCH. Otherwise, if UE 115 fails to detect the foregoing. UE 115 may be configured to decrement an SSSG timer value after each time slot. If UE 115 monitors PDCCH according to SSSG #1 or SSSG #2 and the SSSG timer value reaches 0 (e.g., the SSSG timer expires), UE 115 may be configured to monitor PDCCH according to SSSG #0 (e.g., corresponding to a default SSSG). For each time slot, the SSSG timer value may be allocated as a function of subcarrier spacing (SCS) frequency. As an example, at 15 KHZ, SSSG timer values, per time slot, may correspond to {1, 2, 3, . . . 20, 30, 40, 50, 60, 80, 100}; at 30 KHZ, SSG timer values, per time slot, may correspond to {1, 2, 3, . . . 40, 60, 80, 100, 120, 160, 200}, while at 120 KHZ, SSG timer values, per time slot, may correspond to {1, 2, 3, . . . 160, 240, 320, 400, 480, 640, 800}. When SSSG #1 and SSSG #2 are configured, a common SSSG timer value may be used to switch SSSG #1 to SSSG #0 and SSSG #2 to SSSG #0, each configured per BWP.

Network entity 305 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). In some implementations, network entity 305 may include an interface (e.g., a communication interface) that includes transmitter 356, receiver 358, or a combination thereof. Processor 352 may be configured to execute instructions 360 stored in memory 354 to perform the operations described herein. In some implementations, processor 352 includes or corresponds to one or more of receive processor 238, transmit processor 220, and controller 240, and memory 354 includes or corresponds to memory 242. Network entity 305 may include or correspond to base station 105.

Memory 354 includes or is configured to store instructions 360 and configuration information 362. Configuration information 362 may include or correspond to SS configuration information 364, skipping monitoring duration configuration information 366, SSSG configuration information 368, or a combination thereof. For example, SS configuration information 364 may include or correspond to one or more offset values associated with one or more NES states. Skipping monitoring duration configuration information 366 may include or correspond to an amount of time during which UE 115 is to be instructed to skip or avoid monitoring a channel, such as PDCCH. SSSG configuration information 368 may include or correspond to a number of SSSGs constituting a set of SSSGs.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of network entity 305 described with reference to FIG. 2.

In some implementations, network entity 305 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the network entity 305. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 300 implements a 5G NR network. For example, wireless communications system 300 may include multiple 5G-capable UEs 115 and multiple 5G-capable base stations 105, such as UEs and network entities configured to operate in accordance with a 5G NR network protocol such as that defined by the 3GPP. In some other implementations, wireless communications system 300 implements a 6G network.

During operation of wireless communications system 300, network entity 305 may generate configuration message 370 (e.g., a configuration) based on configuration information 362. Configuration message 370 may include configuration indicator 372. Configuration message 370, configuration indicator 372, or both may be associated with an operating state of a component of wireless communications system 300, such as an NES state of a plurality of NES states associated with network entity 305. The NES state may include or correspond to a mode of operation of a component of wireless communications system 300, such as a mode of operation of network entity 305. The mode of operation may be associated with a quantity of energy used by network entity 305, which may vary over time based on a range of factors, such as a volume of communication handled by network entity 305, a sensitivity of the network traffic handled by network entity 305 to latency, and other factors influencing energy usage of network entity 305 or other components of wireless communications system 300. The plurality of NES states may include or correspond to a plurality of different operating modes of a component of wireless communications system 300, each operating mode corresponding to a different quantity of energy used by the component of wireless communications system 300. Examples of NES states include a downlink (DL) only state, an uplink (UL) only state, a light sleep mode, a deep sleep mode, a served antenna port quantity, or any combination thereof, such as corresponding to an operating mode of network entity 305.

Network entity 305 may generate and transmit configuration message 370, which UE 115 may receive. In response to receipt of configuration message 370, UE 115 may be configured to adjust channel monitoring configuration parameter 306 (e.g., one or more channel monitoring configuration parameters). Additionally, network entity 305 may generate state indicator 374. State indicator 374 may indicate a current or predicted future NES state of network entity 305. In response to receipt of state indicator 374, UE 115 may be configured to selected an adjusted channel monitoring configuration parameter 306 corresponding to the NES state indicated by state indicator 374. Thereafter, UE 115 may be configured to monitor a channel based on the adjusted channel monitoring configuration parameter 306. In this manner, potentially energy intensive channel monitoring, performed by UE 115, may be regulated based on an NES state associated with one or more components of wireless communication network 300, such as by varying one or more channel monitoring configuration parameters 306 in accordance with the NES state associated with the one or more components of wireless communication network 300, such as network entity 305.

In some implementations, UE 115 is configured to adjust channel monitoring configuration parameter 306, such as one or more parameters of a plurality of parameters of an SS, based on an NES state of network entity 305. Additionally or alternatively, channel monitoring configuration parameter 306 may correspond to a skipping monitoring duration indictor, which UE 115 may adjust based on an NES state of network entity 305. In some implementations, channel monitoring configuration parameter 306 may correspond to a set of SSSGs configured based on an NES state of network entity 305.

In some implementations, configuration message 370 may be associated with an SS configuration of an SS. For example, configuration message 370 may indicate an SS configuration based on an NES state, such as an NES state of network entity 305. Configuration indicator 372 may include or correspond to an offset indicator associated with an NES state of a plurality of NES states, such as a present or predicted NES state of network entity 305. In particular, the SS configuration may include, for each parameter of a plurality of parameters of the SS, one or more offset indicators associated with the NES state of the plurality of NES states associated with a component of wireless communication network 300, such as associated with network entity 305. Network entity 305 may be configured to generate the SS configuration based on SS configuration information 364, and may transmit SS configuration to UE 115. In response to receipt, by UE 115, of the SS configuration, UE 115 may configure channel monitoring configuration parameter 306, such as one or more parameters of the plurality of parameters of the SS based on the SS configuration. After configuring the one or more parameters of the plurality of parameters, UE 115 may monitor a channel, such as a PDCCH, based on channel monitoring configuration parameter 306, such as the configured one or more parameters of the SS. Accordingly, UE 115 may varying a frequency with which UE 115 monitors the channel as a function of an NES state of network entity 305. For example, in response to network entity 305 being in a low energy NES state (e.g., a sleep mode), UE 115 may monitor the channel with a reduced frequency. As another example, in response to network entity 305 being in a high energy NES state (e.g., an active mode), UE 115 may monitor the channel with an increased frequency. In this way, UE 115 is configurable to modulate its energy usage based an overall network traffic volume and type handled by network entity 305.

In some implementations, UE 115 may receive, from network entity 305, state indicator 374 indicating a current or predicted future state of network entity 305, such as a current or predicted future NES state. UE 115 may be configured to determine the NES state based on the state indicator, and UE 115 may select an offset indicator from among a plurality of offset indicator based on the NES state. Channel monitoring configuration parameter 306 may include or correspond to the plurality of parameters of the SS. The plurality of parameters of the SS may include or correspond to a monitoring slot periodicity and offset parameter, a duration parameter, a monitoring symbols within a slot parameter, or a number of PDCCH candidates per control channel element (CCE) aggregation level. UE 115 may be operable to configure one or more parameters of the plurality of parameters of the SS based on the SS configuration. In some implementations, the SS may be associated with a control resource set (CORESET). The SS may include a USS or a CSS. Further, configuration message 370, corresponding to the SS configuration, may be included in a radio resource control (RRC) or broadcast in a system information block (SIB), such as transmitted by network entity 305.

The offset indicator, corresponding to configuration indicator 372, may include an offset value with respect to a default NES operating state of network entity 305, a default NES operating state of another component of wireless communications system 300, or a combination thereof. In particular, the offset value may be based on a default NES state, such as a default NES operating state of network entity 305, a default NES state of another component of wireless communications system 300, or a combination thereof. To illustrate and in a case in which channel monitoring configuration parameter 306 includes or indicates one or more parameters of an SS and in response to the one or more parameters of the SS being a monitoring slot periodicity and offset parameter, a default NES state of the monitoring slot periodicity and offset parameter may be a value of sl1, indicating to UE 115, to monitor the SS at every slot. Offset indicator 372 may include an offset value of three units, indicating, to UE 115, to offset the monitoring slot periodicity and offset parameter of sl1 by three units to result in an adjusted monitoring slot periodicity and offset parameter of sl4, thereby causing UE 115 to monitor the SS at every fourth slot rather than at every slot. In this manner, UE 115 may reduce an amount of energy used compared with when UE 115 was monitoring the SS at every slot, as in a default NES state of UE 115. As another example, in a case in which channel monitoring configuration parameter 306 includes or indicates one or more parameters of an SS and in response to the one or more parameters of the SS being a duration parameter, offset indicator 372 may include an offset value of minus three microseconds (−3 μs). Accordingly, if, in a default NES state, UE 115 monitors the SS for a PDCCH candidate for 4 μs, offset indicator 372 of −3 μs may cause UE 115 to adjust the duration parameter of the default NES state by −3 μs so that the adjusted duration parameter is 1 μs (e.g., 4 μs minus 3 μs) so that UE 115 monitors the SS for the PDCCH candidate for 1 μs rather than for 4 μs, as in the default NES state. By monitoring the SS for the PDCCH candidate for 1 μs rather than 4 μs, UE 115 may reduce an amount of energy consumed as compared with when UE 115 operates in the default NES state.

UE 115 may configure the one or more parameters of the plurality of parameters of the SS, based on the SS configuration, by adjusting the one or more parameters in accordance with the offset value. Subsequently, UE 115 may be operable to monitor the SS for PDCCH candidates in accordance with the adjusted one or more parameters.

In some implementations, the SS configuration further includes a plurality of offset indicators, including the offset indicator. Each offset indicator of the plurality of offset indicators may be associated with a corresponding NES state of the plurality of NES states, and each offset indicator may include an offset value. UE 115 may receive, such as from network entity 305, state indicator 374, which may be included in in DCI, a medium access control-control element (MAC-CE), or a combination thereof. UE 115 may be configured to determine the NES state based on state indicator 374. Subsequently, UE 115 may be configured to select the offset indicator from among the plurality of offset indicators based on the NES state. Additionally, UE 115 may configure the one or more parameters of the plurality of parameters of the SS based on an offset value corresponding to the offset indicator (e.g., the selected offset indicator) as explained above with reference to various examples.

As an additional example, UE 115 may receive, from network entity 305, a second state indicator distinct from state indicator 374. The second state indicator may correspond to a second NES state, such as a current or predicted future NES state of a component of wireless communication network 300, such as of network entity 305. UE 115 may be configured to determine the second NES state based on the second state indicator. Additionally, UE 115 may be configured to selecting a second offset indicator from among the plurality of offset indicators in which the second offset indicator corresponds to the second NES state. Further, UE 115 may configure the one or more parameters of the plurality of parameters of the SS based on the SS configuration by adjusting the one or more parameters based on a second offset value corresponding to the second offset indicator.

In some implementations, configuration message 370 may include or correspond to a skipping monitoring duration message The skipping monitoring duration message may include a skipping monitoring duration indicator that corresponds to configuration indicator 372. Network entity 305 may be configured to generate the skipping monitoring duration configuration based on skipping monitoring duration configuration information 366, and may transmit configuration message 370 that includes or corresponds to the skipping monitoring duration configuration to the UE 115. For example, the skipping monitoring duration configuration may be included in DCI. The skipping monitoring duration indicator, included in the skipping monitoring duration configuration, may be based on an NES state of a plurality of NES states, such as a current or predicted future NES state of network entity 305, and the skipping monitoring duration indicator may indicate a skipping monitoring duration value. In response to receipt of the skipping monitoring duration configuration. UE 115 may be configured to adjust a skipping monitoring duration parameter, corresponding to channel monitoring configuration parameter 306. Accordingly, by adjusting the skipping monitoring duration parameter based on the skipping monitoring duration indicator, UE 115 may be configured to monitor a channel, such as a PDCCH, based on the skipping monitoring duration indicator. In particular, UE 115 may be configured to avoid or skip monitoring the channel, such as PDCCH, for a duration indicated by the skipping monitoring duration indicator.

In some implementations, UE 115 may receive, from network entity 305, state indictor 374 of the NES state, and state indicator 374 may be included in RRC or in an SIB. UE 115 may be configured to monitor the channel, such as PDCCH, in response to receipt of state indicator 374. For example, while UE 115 may be configured to adjust a skipping monitoring duration parameter, corresponding to one or more channel monitoring configuration parameters 306, based on the skipping monitoring duration indicator, UE 115 may be configured to monitor a channel based on the skipping monitoring duration indicator after receipt of state indicator 374, indicating an actual NES state of network entity 305. In some implementations, the skipping monitoring duration configuration may correspond to a first bandwidth part (BWP). UE 115 may receive a second monitoring duration configuration corresponding to a second BWP.

Accordingly, in response to one or more components, such as network entity 305, of wireless communications network 300 being in a high energy NES state, network entity 305 may apply skipping monitoring configuration information 366 to generate configuration message 370 that includes or corresponds to skipping monitoring duration configuration bearing skipping monitoring duration indicator having a first value that corresponds to the high energy NES state of the network entity 305. In response to receipt of configuration message 370 that includes or corresponds to skipping monitoring duration indicator, UE 115 may adjust a skipping monitoring duration, corresponding to one or more channel monitoring configuration parameters 306, by reducing the skipping monitoring duration to account for the higher energy state of network entity 305. Conversely, in response to one or more components, such as network entity 305, of wireless communications network 300 being in a low energy NES state, network entity 305 may apply skipping monitoring configuration information 366 to generate a second configuration message that includes or corresponds to a second skipping monitoring duration configuration bearing a second monitoring duration indicator having a second value that corresponds to the low energy NES state of the network entity 305. In response to receipt of configuration 370 that includes or corresponds to the second skipping monitoring duration indicator, UE 115 may adjust a skipping monitoring duration, corresponding to one or more channel monitoring configuration parameters 306, by increasing the skipping monitoring duration to account for the lower energy state of network entity 305.

In some implementations, the skipping monitoring duration configuration indicates a second skipping monitoring duration indicator associated with a second skipping monitoring duration value that may be distinct from the skipping monitoring duration value. The second skipping monitoring duration value may be based on a second NES state of the plurality of NES states. The second NES state may be distinct from the NES state.

In some implementations, the skipping monitoring duration configuration includes a first plurality of skipping monitoring duration indicators associated with the NES state, such as the NES state of network entity 305, and UE may be configured to dynamically adjust channel monitoring, such as monitoring PDCCH, based on the plurality of skipping monitoring duration indicators. Additionally or alternatively, the skipping monitoring duration configuration may indicate a second plurality of skipping monitoring duration indicators that may be based on a second NES state of the plurality of NES states. The second NES state may be distinct from the NES state.

In some implementations, network entity 305 may be configured to generate, based on SSSG configuration information 368, configuration message 370 that may include or correspond to an SSSG configuration. The SSSG configuration may be based on an NES state of a plurality of NES states, such as an NES state associated with a component of wireless communications system 300 (e.g., network entity 305). Additionally, the SSSG configuration may include an offset indicator corresponding to configuration indicator 372 and that is associated with the NES state. In this example, channel monitoring configuration parameters 306 may correspond to a set of SSSGs, and UE 115 may be configured to select a set of SSSGs based on the SSSG configuration. Additionally, UE 115 may be configured to perform channel monitoring, such as monitoring a PDCCH, based on the set of SSSGs.

Further, UE 115 may be configured to switch from a first SSSG (e.g., a first SSSG of the set of SSSGs) to a second SSSG (e.g., a second SSSG of the set of SSSGs) based on the NES state. For example, the UE may switch from the first SSSG to the second SSSG by initiating a transition from the first SSSG to the second SSSG based on an offset value corresponding to the offset indicator. The offset value may be defined based on a default NES state, such as a typical operating NES state of network entity 305. Additionally or alternatively, UE 115 may initiate a transition from the first SSSG to the second SSSG by setting a timer based on the offset value and in which expiration of the timer initiates the transition from the first SSSG to the second SSSG.

In some implementations, the SSSG configuration includes a plurality of offset indicators corresponding to an NES state. UE 115 may be configured to initiate transition from the first SSSG to the second SSSG based on an offset indicator selected from among the plurality of offset indicators in response to receipt of state indicator 374.

In some implementations, the SSSG configuration may indicate a first number of SSSGs allocated to the UE, and the set may include a second number of SSSGs that is less than the first number of SSSGs. For example, the SSSG configuration may include K SSSSGs allocated per NES state, while the selected set of SSSGs may include three (3) SSSGs selected from among the set.

In some implementations, UE 115 may receive, such as from network entity 305, state indicator 374, indicating the NES state, such as the NES state of one or more components of wireless communications system 300, for example, network entity 305. UE 115 may be configured to select the set of SSSGs based on state indicator 374. In some implementations, state indicator 374 may be included in DCI, RRC, or SIB. In response to failure to receive state indicator 374, UE 115 may be configured to select a default SSSG. The default SSSG may correspond to a default state, such as a default NES state associated with network entity 305, such as may be associated with a typical operational state of the network entity 305.

In some implementations, UE 115 is configurable with a plurality of NES states; however, network entity 305 may configure UE 115 with an NES state selected from among the plurality of NES states based on overall expected energy usage. For example, selection of any NES state from among the plurality of NES states generally is proportional to overall network traffic, which is indicative of overall energy expenditure. To illustrate, when wireless communications system 300 has a relatively smaller volume of network traffic, network entity 305 may use a smaller number of antenna ports to transmit data to UE 115 as compared with instances in which wireless communications system 300 has a relatively larger volume of network traffic. In such instances, network entity 305 may use a larger number of antenna ports to transmit data to UE 115. However, use, by network entity 305, of more antenna ports to transmit data to UE 115 generally results in greater energy expenditure by network entity 305.

As another example, in higher energy NES states, UE 115 is expected to be served more frequently by network entity 305 than in lower energy NES states. Moreover, in higher energy NES states UE 115 is expected to have a greater UL traffic burden than in lower energy NES states. Notably, there is a correlation between optimized monitoring, by UE 115, of channels, such as PDCCH occasions and associated PDCCH parameters, and NES states. Accordingly, dynamically adjusting a UE's PDCCH monitoring or PDCCH skipping behavior as a function of NES states may enhance overall network energy efficiency.

As described with reference to FIG. 3, the present disclosure provides techniques for supporting dynamic adjustment of one or more operations performed by UE 115, such as monitoring, by UE 115, of a channel (e.g., PDCCH) based on a state of a communication network, such as an NES state of one or more components of wireless communications system 300 (e.g., network entity 305). The techniques described enhance an efficiency with which wireless communications system 300 uses energy, thereby leading to lower wireless communications system 300 operating costs and reducing wireless communications system 300 energy expenditure. The foregoing results are achieved without sacrificing communication quality. To illustrate, when UE 115 adjusts channel monitoring configuration parameter 306, such as one or more parameters of a plurality of parameters of the SS, based on configuration message 370, such as SS configuration, that includes configuration indicator 372 associated with one or more NES states of a plurality of NES states corresponding to a component of wireless communications system 300 (e.g., network entity 305), UE 115 may reduce a quantity of channel monitoring occasions (e.g., PDCCH monitoring occasion), increase skipping monitoring duration, or select a set of SSSGs that correlate with a current NES state or a future NES state, such as a predicted or anticipated future NES state. In this manner, when an NES state corresponds to a high energy NES state (e.g., due to a high volume of network traffic), UE 115 is configured, by network entity 305, to adjust channel monitoring configuration parameter 306 to expend a higher energy to accommodate high network traffic volume. In contrast, when an NES state corresponds to a low energy NES state (e.g., due to a lower volume of network traffic), UE 115 is configured, by network entity 305, to adjust channel monitoring configuration parameters 306 to expend less energy to accommodate lower network traffic volume.

Figure 4:
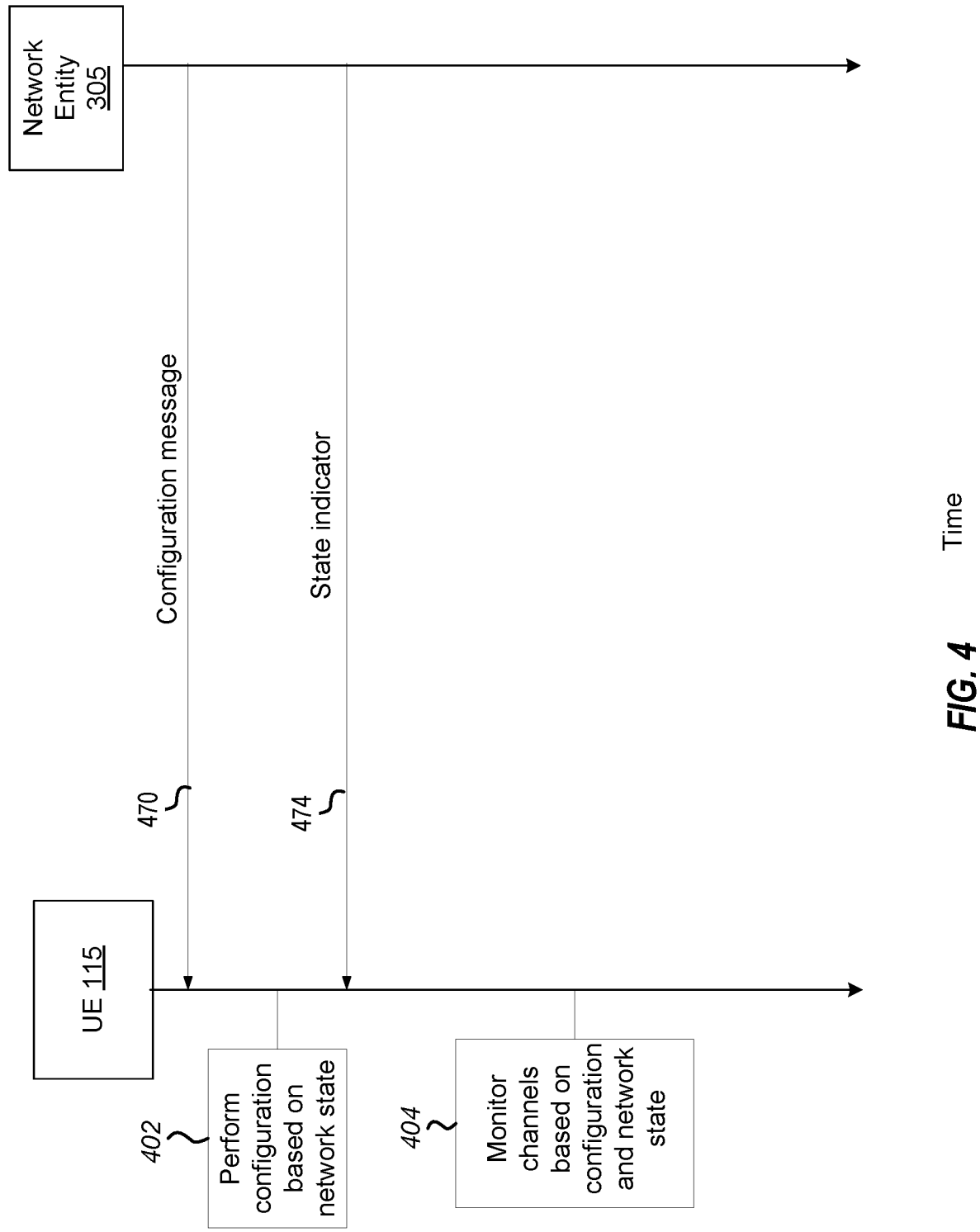
FIG. 4 is a ladder diagram illustrating an example of adjustment of one or more operations based on a state of a communication network according to one or more aspects.

FIG. 4 is a ladder diagram illustrating an example of adjustment of one or more operations based on a state of a communication network according to one or more aspects. As shown in FIG. 4, a system of the ladder diagram includes UE 115 and network entity 305. Network entity 305 may include or correspond to a base station, a core network, or a combination thereof. UE 115 and network entity 305 may include one or more components and be configured to perform one or more operations, as described with reference to FIGS. 1-3.

At 470, network entity 305 transmits the configuration message to UE 115. The configuration message may correspond to configuration message 370. The configuration message may include one or more indicators associated with one or more NES states of a plurality of NES states of one or more components of a wireless communication system, such as one or more NES states of network entity 305. The one or more indicators may include or correspond to one or more offset values operable to adjust one or more channel monitoring parameters based on the one or more NES states of network entity 305.

In response to receiving the configuration message, at 402, UE 115 may configure the one or more channel monitoring parameters in accordance with the one or more indicators. The one or more channel monitoring parameters may include or correspond to channel monitoring parameter 306.

At 474, network entity 305 may transmit a state indicator indicating a current NES state of network entity 305, of other component of a wireless communications system, or both. The state indicator may include or correspond to state indicator 374. Additionally or alternatively, the state indicator may denote a predicted future NES state of network entity 305, of other component of a wireless communications system, or both.

At 404, in response to receiving the state indicator, UE 115 may perform operations, such as channel monitoring operations. These channel monitoring operations may be based on the specific configuration of the one or more channel monitoring parameters and that are associated with a NES state identified in the state indicator.

In some implementations, the configuration message (transmitted at 470) may include or correspond to an SS configuration that includes, for each CORESET, a plurality of indicators corresponding to offset values associated with a plurality of NES states, such as a plurality of possible NES states associated with network entity 305, typical (i.e., average or expected) NES states associated with network entity 305, or a combination thereof. In particular, SS configuration may specify multiple values for each parameter per NES state. Each indicator of the plurality of indicators may correspond to an offset value associated with an NES state of the plurality of NES states, and the offset value may be predicated on or defined based on a default NES state. A default NES state may correspond to a typical or average energy usage state of a component of a wireless communications system, such as a typical or average energy usage state of network entity 305.

In response to receipt of the SS configuration, UE 115 may adjust parameters of an SS associated with a specified CORSET. For example, the adjusted parameters may include monitoringSlotPeriodicityAndOffset, duration, monitoringSymobolsWithinSlot, nrofCandidates, or a combination thereof. The CORSETs to be adjusted in accordance with the SS configuration may be indicated in a RRC received by UE 115. Upon switching to an NES state, UE 115 may autonomously adjust the parameters of the SS in accordance with the one or more indicators (e.g., offset values) corresponding to the NES state. For instance, in response to receipt, by UE 115, of a state indicator, indicating a present NES state of network entity 305, a predicted future NES state of network entity 305, or a combination thereof, UE 115 may be configured to adjust the one or more SS parameters that correspond to the identified NES state based on the one or more indicators (e.g., offset values) included in the SS configuration. In some implementations, the state indicator may be included in a DCI, an MAC-CE, or both. UE 115 may be configured to select one or more offset values of a plurality of offset values based on the state indicator. If no indication is indicated or if UE 115 fails to receive the state indicator, UE 115 may be configured to apply a default offset value per NES state.

In some implementations, the configuration message (transmitted at 470) may include at least a first indicator that indicates a skipping monitoring duration that depends on an NES state, such as an NES state of one or more components of wireless communications network (e.g., network entity 305). Additionally, the configuration message may include at least a second indicator that indicates to UE 115 to perform channel monitoring skipping, such as PDCCH skipping. For example, network entity 305 may transmit the configuration message in a scheduling DCI that indicates, to UE 115, to perform channel monitoring skipping, such as PDCCH skipping, and that further indicates, to UE 115, a skipping monitoring duration value associated with an NES state.

Additionally or alternatively, the configuration message (transmitted at 470) may include a plurality of indicators, each of which corresponds to multiple skipping monitoring duration values for each NES state. The multiple skipping monitoring duration values may be RRC configured or broadcast in SIB. UE 115 may be configured to select a skipping monitoring duration value of the plurality of skipping monitoring duration values based on the state indicator, which may, in addition to indicating an NES state, indicate the skipping monitoring duration value for UE 115 to apply. The state indicator may be transmitted to UE 115 in a DCI.

In some implementations, the configuration message (transmitted at 470) may include or correspond to a designated quantity of SSSGs per NES state. For example, network entity 305 may generate a configuration message that includes an indicator indicating K SSSG states (where K may be any integer value that is greater than zero) for each NES state associated with one or more components of a wireless communications system, such as that may be associated with each possible or probable NES state of network entity 305. For example, K may be greater than or equal to three. In some implementations, network entity 305 may select the value of K, may select the specific SSSGs, or a combination thereof, all based on SSSG configuration information 368, which may include or correspond to information about capabilities of UE 115; which may be indicated via layer 1 (L1), layer 2 (L2), and/or layer 3 (L3); or combinations thereof. In some implementations, the configuration message may be sent via RRC such that SSSGs for each NES state are RRC configured.

In response to receiving the configuration message, UE 115 may configure the designated K SSSG states. Subsequently, in response to receiving a state indicator, such as from network entity 305, indicating a current NES state, a predicted future NES state, or both of one or more components of a wireless communications system, such as of network entity 305, UE 115 may be configured to select a quantity of the K SSSG states, such as three SSSG states out of the K SSSG states. For instance, in some implementations, in addition to indicating the NES state, the state indicator may indicate a quantity of SSSG states for UE 115 to select from among the K SSSG states, which of the K SSSG states to select, or a combination thereof. Thereafter, UE 115 may select a designated number of the K SSSG states, such as three of the K SSSG states, based on layer 1 (L1), layer 2 (L2), and layer 3 (L3). Thus, in some implementations, the state indicator, sent via DCI, may indicate which of three SSSGs is to be activated in response to switching an NES state. If the state indicator fails to provide the foregoing indication, if UE 115 fails to receive the state indicator, or if network entity 305 fails to generate or transmit the state indicator, UE 115 may be configured to activate a default SSSG (e.g., SSSG #0).

In some implementations, the configuration message, such as included in or transmitted by RRC, may include a second indicator indicating an offset value associated with each NES state of a plurality of NES states such that an SSSG timer value of an SSSG timer for initiating a switch from a first SSSG, to a second SSSG, and then to a third SSSG (e.g., SSSG #1 (NES state 0) to SSSG #0 (NES state 1) to SSSG #2 (NES state 2) to SSSG #0 (NES state 1)) is based on or predicated on NES state. Alternatively, the configuration message may include a second indicator indicating a plurality of offset values associated with each NES state of a plurality of NES states, and the state indicator may indicate which offset value from among the plurality of offset values UE 115 is to select for setting an SSSG timer value of an SSSG timer for initiating the switch from a first SSSG to a second SSSG and thence to a third SSSG. Each offset value may be defined relative to or based on a default NES state.

FIG. 5 is a flow diagram illustrating an example process 500 that supports adjustment of one or more operations based on a state of a communication network according to one or more aspects. Operations of process 500 may be performed by a UE, such as UE 115 described above with reference to FIGS. 1-4 or a UE described with reference to FIG. 8. For instance, example operations (also referred to as "blocks") of process 500 may enable UE 115 to support dynamically adjusting one or more operations performed by UE 115 based on a state of a communication network.

In block 502, the UE receives an SS configuration of an SS. The SS configuration may include, for each parameter of a plurality of parameters of the SS, an offset indicator associated with an NES state of a plurality of NES states. The SS configuration may include or correspond to configuration message 370, and the offset indicator may include or correspond to configuration indicator 372.

In block 504, the UE configures one or more parameters of the plurality of parameters of the SS based on the SS configuration. Channel monitoring configuration parameter 306 may include or correspond to the plurality of parameters of the SS. The plurality of parameters of the SS may include or correspond to a monitoring slot periodicity and offset parameter, a duration parameter, a monitoring symbols within a slot parameter, a number of PDCCH candidates per control channel element (CCE) aggregation level parameter, or a combination thereof. In some implementations, the SS may be associated with a CORESET, the NES state may include a mode of operation of a network entity, and the mode of operation may be associated with a quantity of energy (e.g., energy expended by a component of a wireless communications system such as a network entity due to operation of the component). The NES state may correspond to a DL only state, a UL only state, a light sleep mode, a deep sleep mode, a served antenna port quantity, or any combination thereof. For example, the NES state may indicate an amount of energy expended or used by a network entity by indicating whether the network entity is operating in or anticipates to be operating in a DL only state, a UL only state, a light sleep mode, a deep sleep mode, and/or a quantity of antenna ports used by the network entity to transmit data to one or more UEs. After the UE configures the one or more parameters of the plurality of parameters of the SS based on the SS configuration, the UE may search for PDCCH candidates, within a SS, based on the configured one or more parameters of the plurality of parameters of the SS, may monitor PDCCH in accordance with the configured one or more parameters of the plurality of parameters of the SS, or a combination thereof.

In some implementations, the plurality of NES states may correspond to a plurality of different operating modes of a network entity, each operating mode corresponding to a different quantity of energy (e.g., energy expended or used by the network entity). In some implementations, the plurality of parameters may include a monitoring slot periodicity and offset parameter, a duration parameter, a monitoring symbols within a slot parameter, a number of physical downlink control channel candidates per CCE aggregation level, or a combination thereof.

In some implementations, the offset indicator may include an offset value. The UE operable to configure the one or more parameters of the plurality of parameters of the SS based on the SS configuration may include the UE further configured to adjust the one or more parameters based on the offset value.

In some implementations, the SS configuration may further include a plurality of offset indicators, including the offset indicator, and each offset indicator of the plurality of offset indicators may be associated with a corresponding NES state of the plurality of NES states. Further, each offset indicator may include an offset value. For example, the offset value may be based on a default NES state, and the default NES state may correspond to a default operating mode of a network entity. Additionally, the UE may receive a state indicator, and the state indicator may be included in DCI, an MAC-CE, or a combination thereof. The state indicator may include or correspond to state indicator 374. The UE may determine the NES state based on the state indicator. Further, the UE may select the offset indicator from among the plurality of offset indicators based on the NES state. In particular, the UE operable to configure the one or more parameters of the plurality of parameters of the SS based on the SS configuration may include the UE further configured to adjust the one or more parameters based on an offset value corresponding to the offset indicator. Additionally, the UE may be configured to receive a second state indicator distinct from the state indicator. The second state indicator may correspond to a second NES state. Moreover, the UE may determine the second NES state based on the second state indicator. Further, the UE may select a second offset indicator from among the plurality of offset indicators, the second offset indicator corresponding to the second NES state. Additionally, the UE operable to configure the one or more parameters of the plurality of parameters of the SS based on the SS configuration may further include the UE operable to adjust the one or more parameters based on a second offset value corresponding to the second offset indicator.

In some implementations, after the UE configures the one or more parameters of the plurality of parameters, the UE may monitor a channel based on the configured one or more parameters of the SS. The channel may include a PDCCH. Additionally, the SS may include a USS or a CSS. Further, the SS configuration may be included in an RRC or broadcast in an SIB.

FIG. 6 is a flow diagram illustrating an example process 600 that supports adjustment of one or more operations based on a state of a communication network according to one or more aspects. Operations of process 600 may be performed by a UE, such as UE 115 described above with reference to FIGS. 1-4 or a UE described with reference to FIG. 8. For instance, example operations (also referred to as "blocks") of process 600 may enable UE 115 to support adjusting one or more operations performed by UE 115 based on a state of a communication network.

In block 602, a UE receives a skipping monitoring duration configuration that includes a skipping monitoring duration indicator. The skipping monitoring duration configuration may include or correspond to configuration message 370, and the skipping monitoring duration indicator may include or correspond to configuration indicator 372. The skipping monitoring duration indicator may be based on an NES state of a plurality of NES states. In block 604, the UE monitors a channel based on the skipping monitoring duration indicator.

In some implementations, the skipping monitoring duration indicator may indicate a skipping monitoring duration value. The skipping monitoring duration configuration may include a first plurality of skipping monitoring duration indicators associated with the NES state. Additionally, the UE may be configured to monitor the channel based on the first plurality of skipping monitoring duration indicators. In an example, the channel may correspond to a PDCCH. Further, the skipping monitoring duration configuration may indicate a second plurality of skipping monitoring duration indicators. The second plurality of skipping monitoring duration indicators may be based on a second NES state of the plurality of NES states. Moreover, the skipping monitoring duration configuration may indicate a second skipping monitoring duration indicator associated with a second skipping monitoring duration value, distinct from the skipping monitoring duration value. The second skipping monitoring duration value may be based on a second NES state of the plurality of NES states.

In some implementations, the skipping monitoring duration configuration may be included in DCI or a medium access control-control element (MAC-CE). Further, the UE may be configured to receive a state indicator of the NES state. The state indicator may be included in an RRC or in an SIB. Moreover, the UE configured to monitor the channel based on the skipping monitoring duration indicator may include the UE configured to monitor the channel based on the skipping monitoring duration indicator in response to receipt of the state indicator, which may correspond to state indicator 374.

In some implementations, the UE may be configured to receive a second monitoring duration configuration corresponding to a second bandwidth part (BWP). The skipping monitoring duration configuration may include or correspond to a first BWP.

FIG. 7 is a flow diagram illustrating an example process 700 that supports adjustment of one or more operations based on a state of a communication network according to one or more aspects. Operations of process 700 may be performed by a UE, such as UE 115 described above with reference to FIGS. 1-4 or a UE described with reference to FIG. 8. For instance, example operations (also referred to as "blocks") of process 700 may enable UE 115 to support dynamically adjusting one or more operations performed by UE 115 based on a state of a communication network.

In block 702, the UE receives an SSSG configuration. The SSSG configuration may be based on an NES state of a plurality of NES states. The SSSG configuration may include or correspond to configuration message 370.

In block 704, the UE selects a set of SSSGs based on the SSSG configuration. The set of SSSGs from which the UE selects may include or correspond to channel monitoring configuration parameter 306. In response to selecting the set of SSSGs, the UE may monitor PDCCH according to the selected set of SSSGs.

In some implementations, the SSSG configuration indicates a first number of SSSGs allocated to the UE. The set may include a second number of SSSGs that is less than the first number of SSSGs. For example, the first number of SSSGs may correspond to K SSSGs, where K is an integer greater than four. The second number of SSGS may be three SSSGs.

In some implementations, the UE configured to selecting the set of SSSGs may include the UE further configured to select the set of SSSGs based on a state indicator indicating the NES state. The state indicator may include or correspond to state indicator 374. Moreover, the UE may further be configured to receive the state indicator. The state indicator may be included in DCI, an MAC-CE, an RRC, or an SIB.

In some implementations, the UE configured to select the set of SSSGs may include the UE configured to select a default SSSG. The default SSG may be selected in response to a failure to receive a state indicator, such as a failure by the UE to receive the state indicator.

In some implementations, the UE may further be configured to performing channel monitoring based on the set of SSSGs. Additionally, the UE may further be configured to switch from a first SSSG to a second SSSG based on the NES state. Moreover, the SSSG configuration may include an offset indicator corresponding to the NES state. The offset indicator may include or correspond to configuration indicator 372. The UE configured to switch from the first SSSG to the second SSSG may include the UE further configured to initiate transition from the first SSSG to the second SSSG based on an offset value corresponding to the offset indicator. The offset value may be defined based on a default NES state. Additionally, the UE configured to initiate transition from the first SSSG to the second SSSG may further include the UE configured to set a timer (e.g., an SSSG timer) based on the offset value. Expiration of the timer may initiate transition from the first SSSG to the second SSSG. The timer may be deemed to have expired when a value associated with the timer reaches 0.

In some implementations, the SSSG configuration may include a plurality of offset indicators corresponding to the NES state. Additionally, the UE may be configured to initiate transition from the first SSSG to the second SSSG based on an offset indicator selected from among the plurality of offset indicators in response to receipt of a state indicator.

FIG. 8 is a block diagram of an example UE 800 that supports adjustment of one or more operations based on a state of a communication network according to one or more aspects. UE 800 may be configured to perform operations, including the blocks of a process described with reference to FIGS. 5-7. In some implementations, UE 800 includes the structure, hardware, and components shown and described with reference to UE 115 of FIGS. 1-4. For example, UE 800 includes controller 280, which operates to execute logic or computer instructions stored in memory 282, as well as controlling the components of UE 800 that provide the features and functionality of UE 800. UE 800, under control of controller 280, transmits and receives signals via wireless radios 601*a-r* and antennas 252*a-r*. Wireless radios 601*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include channel monitoring configuration parameters 802 and communication logic 803. Channel monitoring configuration parameters 802 may include or correspond to channel monitoring configuration parameters 306 described with reference to FIG. 3. Communication logic 803 may be configured to enable communication between UE 800 and one or more other devices. UE 800 may receive signals from or transmit signals to one or more network entities, such as network entity 305 of FIGS. 1-4 or a network entity as illustrated in FIG. 12.

Figures 9, 10:
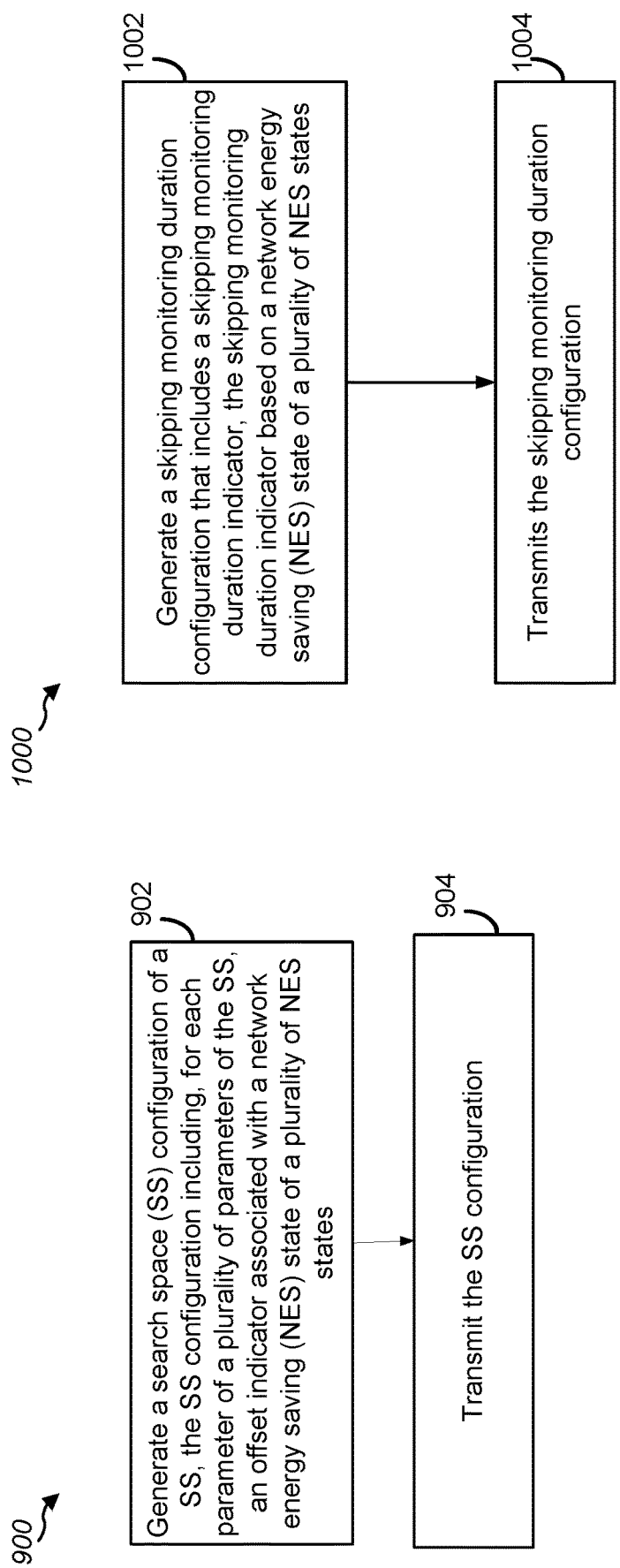
FIG. 9 is a flow diagram illustrating an example process that supports adjustment of one or more operations based on a state of a communication network according to one or more aspects.
FIG. 10 is a flow diagram illustrating an example process that supports adjustment of one or more operations based on a state of a communication network according to one or more aspects.

FIG. 9 is a flow diagram illustrating an example process 900 that supports dynamically adapting one or more operations performed by a user equipment (UE) based on a state of a communication network according to one or more aspects. Operations of process 900 may be performed by a base station, such as network entity 305 described above with reference to FIGS. 1-4 or a network entity as described with reference to FIG. 12. For example, example operations of process 900 may enable network entity 305 to support dynamically adapting one or more operations based on a state of a communication network.

At block 902, the network entity generates an SS configuration of an SS. The SS configuration includes, for each parameter of a plurality of parameters of the SS, an offset indicator associated with an NES state of a plurality of NES states. The SS configuration may include or correspond to configuration message 370, and the offset indicator may include or correspond to configuration indicator 372.

At block 904, the network entity transmits the SS configuration. For instance, the network entity, correspond to network entity 305, may transmit the SS configuration to UE 115.

In some implementations, the SS may be associated with a CORESET, the NES state may include a mode of operation of a network entity, and the mode of operation may be associated with a quantity of energy (e.g., energy expended by a component of a wireless communications system such as a network entity due to operation of the component). The NES state may correspond to a DL only state, a UL only state, a light sleep mode, a deep sleep mode, a served antenna port quantity, or any combination thereof. For example, the NES state may indicate an amount of energy expended or used by a network entity by indicating whether the network entity is operating in or anticipates to be operating in a DL only state, a UL only state, a light sleep mode, a deep sleep mode, and/or a quantity of antenna ports used by the network entity to transmit data to one or more UEs.

In some implementations, the plurality of NES states may correspond to a plurality of different operating modes of a network entity, each operating mode corresponding to a different quantity of energy (e.g., energy expended or used by the network entity). In some implementations, the plurality of parameters may include a monitoring slot periodicity and offset parameter, a duration parameter, a monitoring symbols within a slot parameter, a number of physical downlink control channel candidates per CCE aggregation level, or a combination thereof.

In some implementations, the offset indicator may include an offset value. In some implementations, the SS configuration may further include a plurality of offset indicators, including the offset indicator, and each offset indicator of the plurality of offset indicators may be associated with a corresponding NES state of the plurality of NES states. Further, each offset indicator may include an offset value. For example, the offset value may be based on a default NES state, and the default NES state may correspond to a default operating mode of a network entity.

In some configurations, the network entity may be configured to generate a state indicator, and the network entity may further be configured to transmit the state indicator. The state indicator may include or correspond to state indicator 374. The state indicator may be included in DCI, an MAC-CE, or a combination thereof. The state indicator may be configured to identify a current NES state of the network entity, a predicted future NES state of the network entity, or a combination thereof.

In some configurations, the network entity may be configured to generate a second state indicator distinct from the state indicator, and the network entity may further be configured to transmit the second state indicator. The second state indicator may correspond to a second NES state, such as a second NES state of the network entity. For instance, the second state indicator may correspond to an NES state that the network entity transitions into after being in the NES state. The second state indicator may indicate the second NES state to a receiving device (e.g., a receiving UE).

FIG. 10 is a flow diagram illustrating an example process 1000 that supports adjustment of one or more operations based on a state of a communication network according to one or more aspects. Operations of process 1000 may be performed by a base station, such as network entity 305 described above with reference to FIGS. 1-4 or a network entity as described with reference to FIG. 12. For example, example operations of process 1000 may enable network entity 305 to support dynamically adapting one or more operations based on a state of a communication network.

At block 1002, the network entity generates a skipping monitoring duration configuration that includes a skipping monitoring duration indicator. The skipping monitoring duration indicator may be based on an NES state of a plurality of NES states. The skipping monitoring duration configuration may include or correspond to configuration message 370, and the skipping monitoring duration indicator may include or correspond to configuration indicator 372.

At block 1004, the network entity transmits the skipping monitoring duration configuration. For example, the network entity, corresponding to network entity 305, may transmit the skipping monitoring duration configuration to UE 115.

In some implementations, the skipping monitoring duration indicator may indicate a skipping monitoring duration value. The skipping monitoring duration configuration may include a first plurality of skipping monitoring duration indicators associated with the NES state. Further, the skipping monitoring duration configuration may indicate a second plurality of skipping monitoring duration indicators. The second plurality of skipping monitoring duration indicators may be based on a second NES state of the plurality of NES states. Moreover, the skipping monitoring duration configuration may indicate a second skipping monitoring duration indicator associated with a second skipping monitoring duration value, distinct from the skipping monitoring duration value. The second skipping monitoring duration value may be based on a second NES state of the plurality of NES states.

In some implementations, the skipping monitoring duration configuration may be included in DCI. In some implementations, the network entity may be configured to generate a state indicator of the NES state, and the network entity may further be configured to transmit the state indicator of the NES state. The state indicator may include or correspond to state indicator 374. The state indicator may be included in an RRC or in an SIB.

FIG. 11 is a flow diagram illustrating an example process 1100 that supports adjustment of one or more operations based on a state of a communication network according to one or more aspects. Operations of process 1100 may be performed by a base station, such as network entity 305 described above with reference to FIGS. 1-4 or a network entity as described with reference to FIG. 12. For example, example operations of process 1100 may enable network entity 305 to support dynamically adapting one or more operations based on a state of a communication network.

At block 1102, the network entity generates an SSSG configuration. The SSSG configuration may be based on an NES state of a plurality of NES states. The SSG configuration may include or correspond to configuration message 370.

At block 1104, the network entity transmits the skipping monitoring duration configuration. For example, the network entity, corresponding to network entity 305, may transmit the skipping monitoring duration configuration to UE 115.

In some implementations, the SSSG configuration indicates a first number of SSSGs allocated to the UE. The set may include a second number of SSSGs that is less than the first number of SSSGs. For example, the first number of SSSGs may correspond to K SSSGs, where K is an integer greater than four. The second number of SSGS may be three SSSGs.

In some implementations, the network entity may be configured to generate a state indicator indicating a present or predicted future NES state of the network entity. The state indicator may include or correspond to state indicator 374. Additionally, the network entity may be configured to transmit the state indicator. The state indicator may be included in DCI, an RRC, or an SIB.

In some implementations, the SSSG configuration may include an offset indicator corresponding to the NES state. The offset indicator may include or correspond to configuration indicator 372. The offset value may be defined based on a default NES state. In some implementations, the SSSG configuration may include a plurality of offset indicators corresponding to the NES state.

FIG. 12 is a block diagram of an example network entity 1200 that supports adjustment of one or more operations based on a state of a communication network according to one or more aspects according to one or more aspects. Network entity 1200 may be configured to perform operations, including the blocks of processes 900-1100 described with reference to FIGS. 9-11. In some implementations, network entity 1200 includes the structure, hardware, and components shown and described with reference to base station 105 of FIGS. 1-2 or network entity 305 of FIGS. 3-4. For example, network entity 1200 may include controller 240, which operates to execute logic or computer instructions stored in memory 242, as well as controlling the components of network entity 1200 that provide the features and functionality of network entity 1200. Network entity 1200, under control of controller 240, transmits and receives signals via wireless radios 1201a-t and antennas 234a-t. Wireless radios 1201a-t include various components and hardware, as illustrated in FIG. 2 for network entity 305, including modulator and demodulators 232a-t, transmit processor 220, TX MIMO processor 230, MIMO detector 236, and receive processor 238.

As shown, the memory 242 may include configuration information 1202 and communication logic 1203. Configuration information 1202 may include or correspond to configuration information 362. In some implementations, configuration information 1202 may include or indicate SS configuration information 364, skipping monitoring duration configuration information 366, SSSG configuration information 368, or any combination thereof. Communication logic 1203 may be configured to enable communication between network entity 1200 and one or more other devices. Network entity 1200 may receive signals from or transmit signals to one or more UEs, such as UE 115 of FIGS. 1-4 or UE 800 of FIG. 8.

It is noted that one or more blocks (or operations) described with reference to FIGS. 4-7 and FIGS. 9-11 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 9 may be combined with one or more blocks associated with FIG. 11. As another example, one or more blocks associated with FIGS. 5-7 may be combined with one or more blocks associated with FIGS. 9-11. As another example, one or more blocks associated with FIG. 5-7 or 9-11 may be combined with one or more blocks (or operations) associated with FIGS. 1-4. Additionally, or alternatively, one or more operations described above with reference to FIGS. 1-4 may be combined with one or more operations described with reference to FIG. 8 or 12.

In one or more aspects, techniques for supporting dynamically adapting one or more operations performed by a UE based on a state of a communication network may include additional aspects, such as any single aspect or any combination of aspects described below or in connection with one or more other processes or devices described elsewhere herein. In a first aspect, techniques for supporting dynamically adapting one or more operations performed by a UE based on a state of a communication network may include a method of wireless communication performed by a UE. The method may include receiving an SS configuration of an SS. The SS configuration may include, for each parameter of a plurality of parameters of the SS, an offset indicator associated with an NES state of a plurality of NES states. The techniques may further include configuring one or more parameters of the plurality of parameters of the SS based on the SS configuration. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the SS is associated with a CORESET.

In a third aspect, in combination with the first aspect or the second aspect, the techniques further include the NES state includes a mode of operation of a network entity.

In a fourth aspect, in combination with one or more of the first aspect through the third aspect, the mode of operation associated with a quantity of energy.

In a fifth aspect in combination with one or more of the first aspect through the fourth aspect, the NES state corresponds to a DL only state, a UL only state, a light sleep mode, a deep sleep mode, a served antenna port quantity, or any combination thereof.

In a sixth aspect, in combination with one or more of the first aspect through the fifth aspect, the plurality of NES states correspond to a plurality of different operating modes of a network entity, each operating mode corresponding to a different quantity of energy.

In a seventh aspect, in combination with one or more of the first aspect through the sixth aspect, the plurality of parameters includes a monitoring slot periodicity and offset parameter, a duration parameter, a monitoring symbols within a slot parameter, a number of physical downlink control channel candidates per CCE aggregation level, or a combination thereof.

In an eighth aspect, in combination with one or more of the first aspect through the seventh aspect, the offset indicator includes an offset value, and to configure the one or more parameters of the plurality of parameters of the SS based on the SS configuration, the techniques further include adjusting the one or more parameters based on the offset value.

In a ninth aspect, in combination with one or more of the first aspect through the eighth aspect, the SS configuration further includes a plurality of offset indicators, including the offset indicator, each offset indicator of the plurality of offset indicators associated with a corresponding NES state of the plurality of NES states, each offset indicator including an offset value.

In a tenth aspect, in combination with the ninth aspect, the offset value is based on a default NES state, the default NES state corresponds to a default operating mode of a network entity, or a combination thereof.

In an eleventh aspect, in combination with the ninth aspect, the techniques further include receiving a state indicator, the state indicator included in DCI, an MAC-CE, or a combination thereof.

In a twelfth aspect, in combination with the eleventh aspect, the techniques further include determining the NES state based on the state indicator.

In a thirteenth aspect, in combination with the twelfth aspect, the techniques further include selecting the offset indicator from among the plurality of offset indicators based on the NES state.

In a fourteenth aspect, in combination with the thirteenth aspect, to configure the one or more parameters of the plurality of parameters of the SS based on the SS configuration, the techniques further include adjusting the one or more parameters based on an offset value corresponding to the offset indicator.

In a fifteenth aspect, in combination with the fourteenth aspect, the techniques further include receiving a second state indicator distinct from the state indicator, the second state indicator corresponding to a second NES state.

In a sixteenth aspect, in combination with the sixteenth aspect, the techniques further include determining the second NES state based on the second state indicator.

In a seventeenth aspect, in combination with the sixteenth aspect, the techniques further include selecting a second offset indicator from among the plurality of offset indicators, the second offset indicator corresponding to the second NES state.

In an eighteenth aspect, in combination with the seventeenth aspect, the techniques further include configuring the one or more parameters of the plurality of parameters of the SS based on the SS configuration further includes adjusting the one or more parameters based on a second offset value corresponding to the second offset indicator.

In a nineteenth aspect, in combination with one or more of the first aspect through the eighteenth aspect, the techniques further include, after configuring the one or more parameters of the plurality of parameters, monitoring a channel based on the configured one or more parameters of the SS.

In a twentieth aspect, in combination with the nineteenth aspect, the channel includes a PDCCH.

In a twenty-first aspect, in combination with one or more of the first aspect through the twentieth aspect, the SS includes a USS or a CSS.

In a twenty-second aspect, in combination with one or more of the first aspect through the twenty-first aspect, the SS configuration is included in an RRC or broadcast in a SIB.

In one or more aspects, techniques for supporting dynamically adapting one or more operations performed by a UE based on a state of a communication network may include additional aspects, such as any single aspect or any combination of aspects described below or in connection with one or more other processes or devices described elsewhere herein. In a twenty-third aspect, techniques for supporting dynamically adapting one or more operations performed by a UE based on a state of a communication network may include a method of wireless communication performed by a UE. The method may include receiving a skipping monitoring duration configuration that includes a skipping monitoring duration indicator. The skipping monitoring duration indicator is based on an NES state of a plurality of NES states. The techniques may further include monitoring a channel based on the skipping monitoring duration indicator. In some examples, the techniques in the twenty-third aspect may be implemented in a method or process. In some other examples, the techniques of the twenty-third aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a twenty-fourth aspect, in combination with the twenty-third aspect, the skipping monitoring duration indicator indicates a skipping monitoring duration value.

In a twenty-fifth aspect, in combination with the twenty-fourth aspect, the skipping monitoring duration configuration includes a first plurality of skipping monitoring duration indicators associated with the NES state.

In a twenty-sixth aspect, in combination with the twenty-fifth aspect, the techniques further include monitoring the channel based on the first plurality of skipping monitoring duration indicators, wherein the channel corresponds to a PDCCH.

In a twenty-seventh aspect, in combination with the twenty-fifth aspect or the twenty-sixth aspect, the skipping monitoring duration configuration indicates a second plurality of skipping monitoring duration indicators, the second plurality of skipping monitoring duration indicators based on a second NES state of the plurality of NES states.

In a twenty-eighth aspect, in combination with the twenty-fourth aspect, the skipping monitoring duration configuration indicates a second skipping monitoring duration indicator associated with a second skipping monitoring duration value, distinct from the skipping monitoring duration value, the second skipping monitoring duration value based on a second NES state of the plurality of NES states.

In a twenty-ninth aspect, in combination with one or more of the twenty-third aspect through the twenty-eighth aspect, the skipping monitoring duration configuration is included in DCI) or an MAC-CE.

In a thirtieth aspect, in combination with one or more of the twenty-third aspect through the twenty-ninth aspect, the techniques further include receiving a state indicator of the NES state.

In a thirty-first aspect, in combination with the thirtieth aspect, the state indicator is included in an RRC or in an SIB. In some implementations of the thirty-first aspect, to monitor the channel based on the skipping monitoring duration indicator the techniques further include monitoring the channel based on the skipping monitoring duration indicator in response to receipt of the state indicator.

In a thirty-second aspect, in combination with one or more of the twenty-third aspect through the thirty-first aspect, the techniques further include receiving a second monitoring duration configuration corresponding to a second BWP.

In a thirty-third aspect, in combination with the thirty-second aspect, the skipping monitoring duration configuration corresponds to a first BWP.

In one or more aspects, techniques for supporting dynamically adapting one or more operations performed by a UE based on a state of a communication network may include additional aspects, such as any single aspect or any combination of aspects described below or in connection with one or more other processes or devices described elsewhere herein. In a thirty-fourth aspect, techniques for supporting dynamically adapting one or more operations performed by a UE based on a state of a communication network may include a method of wireless communication performed by a UE. The method may include receiving a SSSG configuration. The SSSG configuration based on an NES state of a plurality of NES states. The techniques may further include selecting a set of SSSGs based on the SSSG configuration. In some examples, the techniques in the thirty-fourth aspect may be implemented in a method or process. In some other examples, the techniques of the thirty-fourth aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a thirty-fifth aspect, in combination with the thirty-fourth, the SSSG configuration indicates a first number of SSSGs allocated to the UE.

In a thirty-sixth aspect, in combination with the thirty-fifth aspect, the set includes a second number of SSSGs that is less than the first number of SSSGs.

In a thirty-seventh aspect, in combination with one or more of the thirty-fourth aspect through the thirty-sixth aspect, to select the set of SSSGs, the techniques further include selecting the set of SSSGs based on a state indicator indicating the NES state.

In a thirty-eighth aspect, in combination with the thirty-seventh aspect, the techniques further include receiving the state indicator. In some implementations of the thirty-eighth aspect, the state indicator is included in DCI, an RRC, an MAC-CE, or an SIB.

In a thirty-ninth aspect, in combination with one or more of the thirty-fourth aspect through the thirty-eighth aspect, to select the set of SSSGs, the techniques further include selecting a default SSSG.

In a fortieth aspect, in combination with the thirty-ninth aspect, the default SSSG is selected in response to a failure to receive a state indicator.

In a forty-first aspect, in combination with one or more of the thirty-fourth aspect through the fortieth aspect, the techniques further include performing channel monitoring based on the set of SSSGs.

In a forty-second aspect, in combination with the forty-first aspect, the techniques further include switching from a first SSSG to a second SSSG based on the NES state.

In a forty-third aspect, in combination with the forty-second aspect, the SSSG configuration includes an offset indicator corresponding to the NES state.

In a forty-fourth aspect, in combination with the forty-third aspect, to switch from the first SSSG to the second SSSG, the techniques further include initiating transition from the first SSSG to the second SSSG based on an offset value corresponding to the offset indicator.

In a forty-fifth aspect, in combination the forty-fourth aspect, the offset value is defined based on a default NES state.

In a forty-sixth aspect, in combination the forty-fourth aspect, to initiate transition from the first SSSG to the second SSSG, the techniques further include setting a timer based on the offset value.

In a forty-seventh aspect, in combination with the forty-sixth aspect, expiration of the timer initiates the transition from the first SSSG to the second SSSG.

In a forty-eighth aspect, in combination with the forty-second aspect, the SSSG configuration includes a plurality of offset indicators corresponding to the NES state.

In a forty-ninth aspect, in combination with the forty-eighth aspect, the techniques further include initiating transition from the first SSSG to the second SSSG based on an offset indicator selected from among the plurality of offset indicators in response to receipt of a state indicator.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-12 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A. B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, the apparatus including:
   at least one processor; and
   a memory coupled to the at least one processor, wherein the at least one processor is configured to:
      receive a search space (SS) configuration of an SS, the SS configuration including, for each parameter of a plurality of parameters of the SS, an offset indicator associated with a network energy saving (NES) state of a plurality of NES states; and
      adjust one or more parameters of the plurality of parameters of the SS based on the SS configuration.

2. The apparatus of claim 1, wherein:
   the SS is associated with a control resource set (CORESET),
   the NES state includes a mode of operation of a network entity, and
   the mode of operation is associated with a quantity of energy.

3. The apparatus of claim 2, wherein the NES state corresponds to a downlink (DL) only state, an uplink (UL) only state, a light sleep mode, a deep sleep mode, a served antenna port quantity, or any combination thereof.

4. The apparatus of claim 1, wherein the plurality of NES states correspond to a plurality of different operating modes of a network entity, each operating mode of the plurality of different operating modes corresponding to a different quantity of energy.

5. The apparatus of claim 1, wherein the plurality of parameters of the SS includes a monitoring slot periodicity and offset parameter, a duration parameter, a monitoring symbols within a slot parameter, a number of physical downlink control channel candidates per control channel element (CCE) aggregation level, or a combination thereof.

6. The apparatus of claim 1, wherein the offset indicator includes an offset value, and wherein configuring the one or more parameters of the plurality of parameters of the SS based on the SS configuration includes adjusting the one or more parameters based on the offset value.

7. The apparatus of claim 1, wherein the SS configuration further includes a plurality of offset indicators, including the offset indicator, and wherein each offset indicator of the plurality of offset indicators is associated with a corresponding NES state of the plurality of NES states, each offset indicator including an offset value.

8. The apparatus of claim 7, wherein the offset value is based on a default NES state, and wherein the default NES state corresponds to a default operating mode of a network entity.

9. The apparatus of claim 7, wherein the at least one processor is further configured to:
   receive a state indicator, the state indicator included in downlink control information (DCI), a medium access control-control element (MAC-CE), or a combination thereof;
   determine the NES state based on the state indicator; and
   select the offset indicator from among the plurality of offset indicators based on the NES state.

10. The apparatus of claim 9, wherein:
    to adjust the one or more parameters of the plurality of parameters of the SS based on the SS configuration, the at least one processor is configured to adjust the one or more parameters based on an offset value corresponding to the offset indicator, and
    the at least one processor is further configured to:
       receive a second state indicator distinct from the state indicator, the second state indicator corresponding to a second NES state;
       determine the second NES state based on the second state indicator; and
       select a second offset indicator from among the plurality of offset indicators, the second offset indicator corresponding to the second NES state, wherein configuring the one or more parameters of the plurality of parameters of the SS based on the SS configuration further includes adjusting the one or more parameters based on a second offset value corresponding to the second offset indicator.

11. The apparatus of claim 1, wherein:
    the at least one processor is further configured to monitor a channel based on the configured one or more parameters of the SS after adjustment of the one or more parameters of the plurality of parameters of the SS, and
    the channel includes a physical downlink control channel (PDCCH).

12. The apparatus of claim 1, wherein the SS includes a UE specific SS (USS) or a common SS (CSS).

13. The apparatus of claim 1, wherein the SS configuration is included in a radio resource control (RRC) message or broadcast in a system information block (SIB).

14. An apparatus for wireless communication, the apparatus including:
    at least one processor; and
    a memory coupled to the at least one processor, wherein the at least one processor is configured to:
       receive a skipping monitoring duration configuration that includes a skipping monitoring duration indicator, the skipping monitoring duration indicator being based on a network energy saving (NES) state of a plurality of NES states; and
       monitor a channel based on the skipping monitoring duration indicator.

15. The apparatus of claim 14, wherein the skipping monitoring duration indicator indicates a skipping monitoring duration value.

16. The apparatus of claim 15, wherein:
    the skipping monitoring duration configuration includes a first plurality of skipping monitoring duration indicators associated with the NES state, and
    the at least one processor further configured to monitor the channel based on the first plurality of skipping monitoring duration indicators, wherein the channel corresponds to a physical downlink control channel (PDCCH).

17. The apparatus of claim 16, wherein the skipping monitoring duration configuration indicates a second plurality of skipping monitoring duration indicators, the second plurality of skipping monitoring duration indicators based on a second NES state of the plurality of NES states.

18. The apparatus of claim 15, wherein the skipping monitoring duration configuration indicates a second skipping monitoring duration indicator associated with a second skipping monitoring duration value, distinct from the skipping monitoring duration value, the second skipping monitoring duration value based on a second NES state of the plurality of NES states.

19. The apparatus of claim 14, wherein the skipping monitoring duration configuration is included in downlink control information (DCI) or a medium access control-control element (MAC-CE).

20. The apparatus of claim 14, wherein:
the at least one processor is further configured to receive a state indicator of the NES state, wherein the state indicator is included in a radio resource control (RRC) or in a system information block (SIB), and
to monitor the channel based on the skipping monitoring duration indicator, the at least one processor is configured to monitor the channel based on the skipping monitoring duration indicator in response to receipt of the state indicator.

21. The apparatus of claim 14, wherein:
the at least one processor is further configured to receive a second monitoring duration configuration corresponding to a second bandwidth part (BWP), and
the skipping monitoring duration configuration corresponds to a first BWP.

22. An apparatus for wireless communication, the apparatus including:
at least one processor; and
a memory coupled to the at least one processor, wherein the at least one processor is configured to:
receive a search space set group (SSSG) configuration, the SSSG configuration based on a network energy saving (NES) state of a plurality of NES states; and
select a set of SSSGs based on the SSSG configuration.

23. The apparatus of claim 22, wherein the SSSG configuration indicates a first number of SSSGs allocated to a user equipment (UE), and wherein the set includes a second number of SSSGs that is less than the first number of SSSGs.

24. The apparatus of claim 22, wherein:
to select the set of SSSGs, the at least one processor is configured to select the set of SSSGs based on a state indicator indicating the NES state, and
the at least one processor is further configured to receive the state indicator, wherein the state indicator is included in downlink control information (DCI), a radio resource control (RRC), a medium access control-control element (MAC-CE), or a system information block (SIB).

25. The apparatus of claim 22, wherein, to select the set of SSSGs, the at least one processor is configured to selecting a default SSSG, and wherein the default SSSG is selected in response to a failure to receive a state indicator.

26. The apparatus of claim 22, wherein the at least one processor is further configured to:
perform channel monitoring based on the set of SSSGs; and
switch from a first SSSG to a second SSSG based on the NES state.

27. The apparatus of claim 26, wherein:
the SSSG configuration includes an offset indicator corresponding to the NES state, and
to switch from the first SSSG to the second SSSG, the at least one processor is configured to initiate transition from the first SSSG to the second SSSG based on an offset value corresponding to the offset indicator.

28. The apparatus of claim 27, wherein the offset value is defined based on a default NES state.

29. The apparatus of claim 27, wherein, to initiate transition from the first SSSG to the second SSSG, the at least one processor is configured to set a timer based on the offset value, and wherein expiration of the timer initiates the transition from the first SSSG to the second SSSG.

30. The apparatus of claim 26, wherein:
the SSSG configuration includes a plurality of offset indicators corresponding to the NES state, and
the at least one processor is configured to initiate transition from the first SSSG to the second SSSG based on an offset indicator selected from among the plurality of offset indicators in response to receipt of a state indicator.

* * * * *